(12) United States Patent
Bryant, Jr. et al.

(10) Patent No.: US 6,385,849 B1
(45) Date of Patent: May 14, 2002

(54) IDLER ROLL BEARING ASSEMBLY

(75) Inventors: C. Edward Bryant, Jr.; Robert H. Wheeler, both of Winfield; William R. Ellis, Fayette; Thomas E. Morrison, Guin, all of AL (US); Jeffrey D. Bell, Newton Falls, OH (US)

(73) Assignee: Continental Conveyor & Equipment Company, Winfield, AL (US)

( * ) Notice: Subject to any disclaimer, the term of this patent is extended or adjusted under 35 U.S.C. 154(b) by 107 days.

(21) Appl. No.: 09/628,771

(22) Filed: Jul. 31, 2000

Related U.S. Application Data

(60) Provisional application No. 60/148,197, filed on Aug. 10, 1999.

(51) Int. Cl.[7] .............................................. B21K 1/02
(52) U.S. Cl. ............. 29/895.21; 29/895.2; 29/898.062; 29/898.07; 29/430; 492/16; 384/587
(58) Field of Search .......................... 29/895.21, 895.2, 29/898.07, 898.062, 430; 492/16, 47; 384/546, 587, 489

(56) References Cited

U.S. PATENT DOCUMENTS

| 1,516,083 | A | * | 11/1924 | Curtis |
| 1,689,496 | A | * | 10/1928 | Moore |
| 3,608,987 | A | * | 9/1971 | Jordan |
| 3,830,633 | A | * | 8/1974 | Harbottle |
| 5,234,100 | A | * | 8/1993 | Cook |
| 5,535,517 | A | * | 7/1996 | Rode |
| 6,287,014 | B1 | * | 9/2001 | Salla |

* cited by examiner

Primary Examiner—S. Thomas Hughes
Assistant Examiner—Eric Compton
(74) Attorney, Agent, or Firm—Pearne & Gordon LLP

(57) ABSTRACT

A method of assembling an idler roll having an outer shell and end bearing assemblies. The bearing assemblies each have an outer race and an inner race. The inner race is press fitted onto a roller shaft to an initial position which is spaced inwardly from a final desired position. The outer shell of the roll is restrained and the shaft is reciprocated along its longitudinal axis to determine the degree of axial movement. The inner race of the bearing assembly is moved from its initial position to its final position as determined by the degree of axial movement.

7 Claims, 18 Drawing Sheets

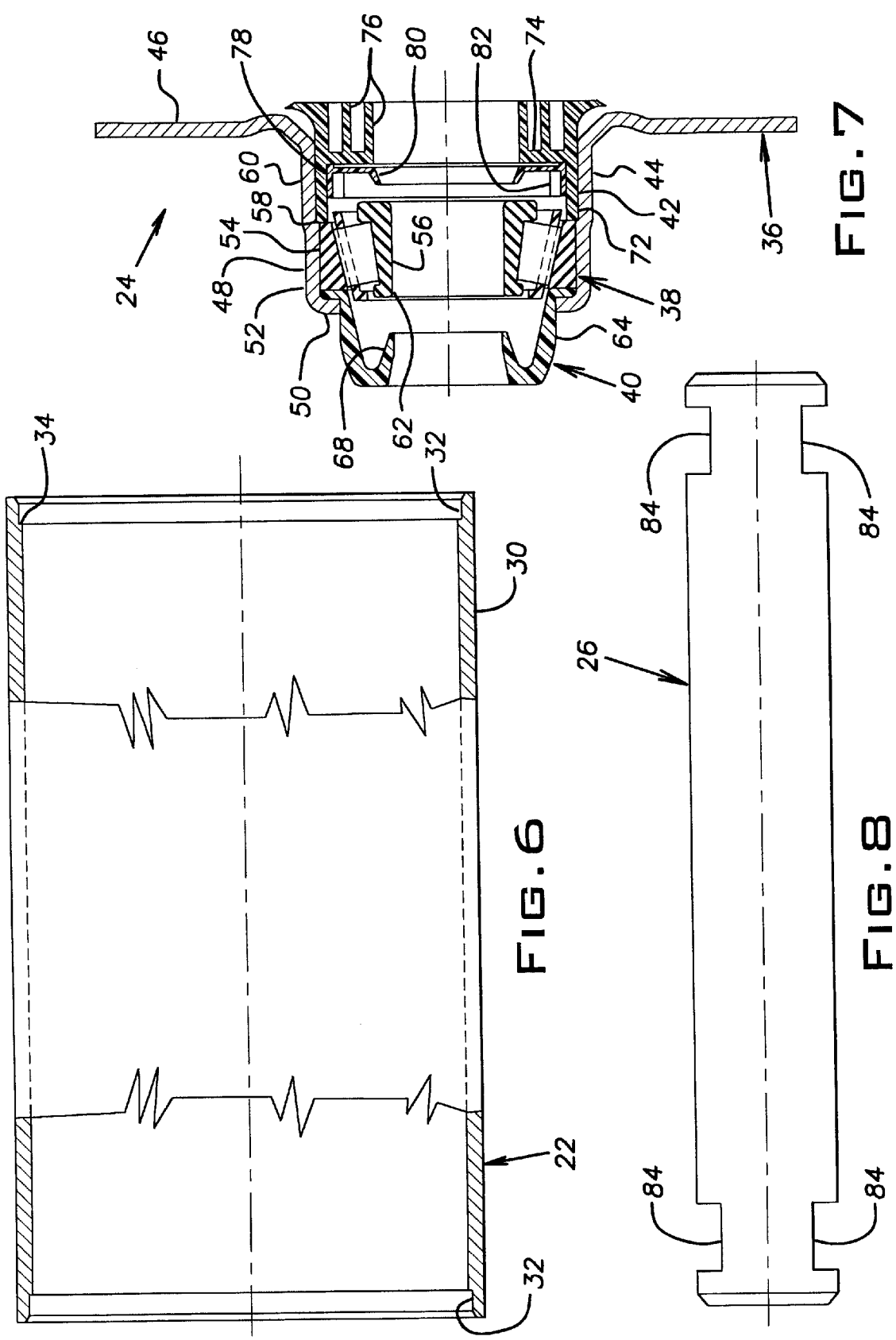

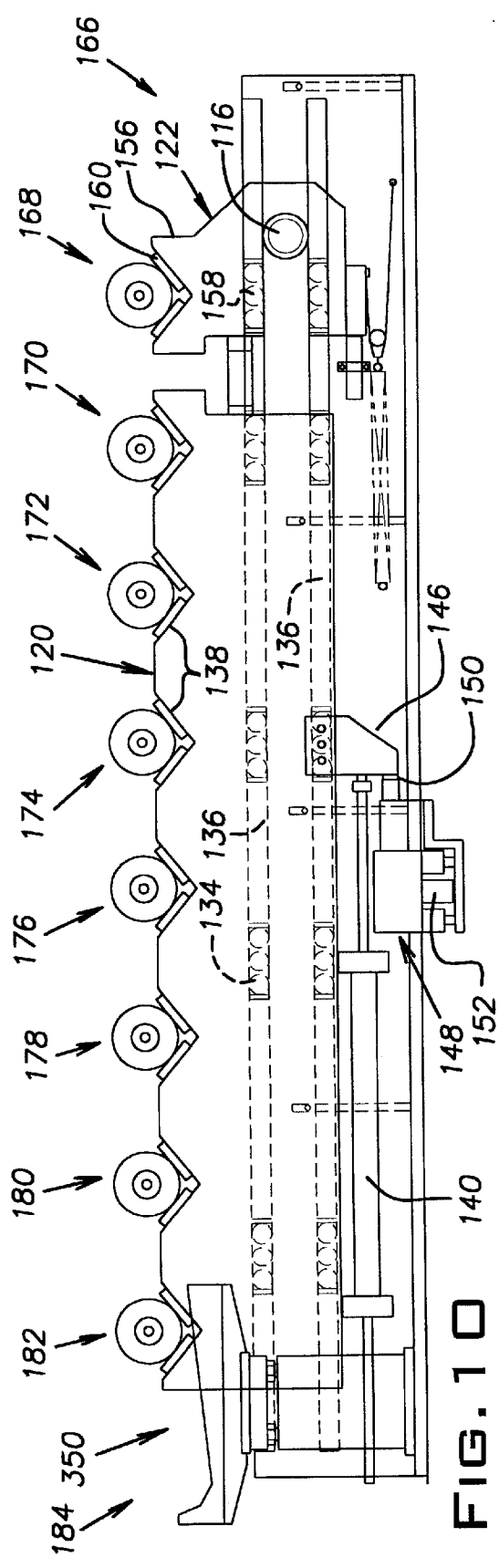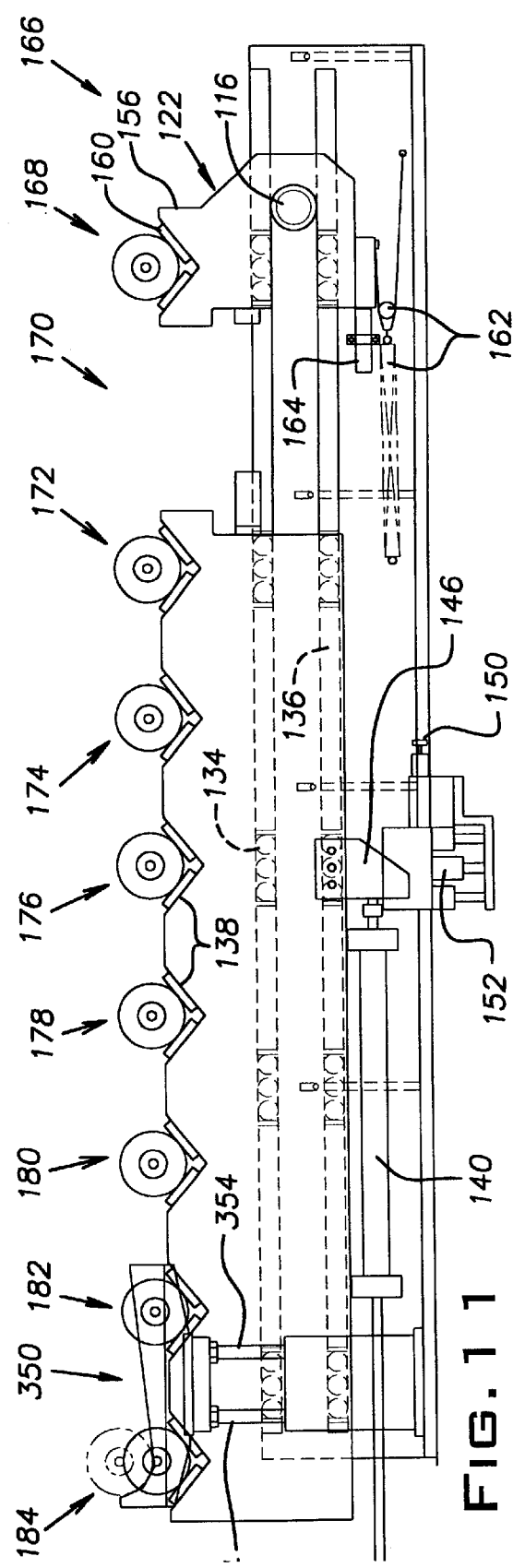

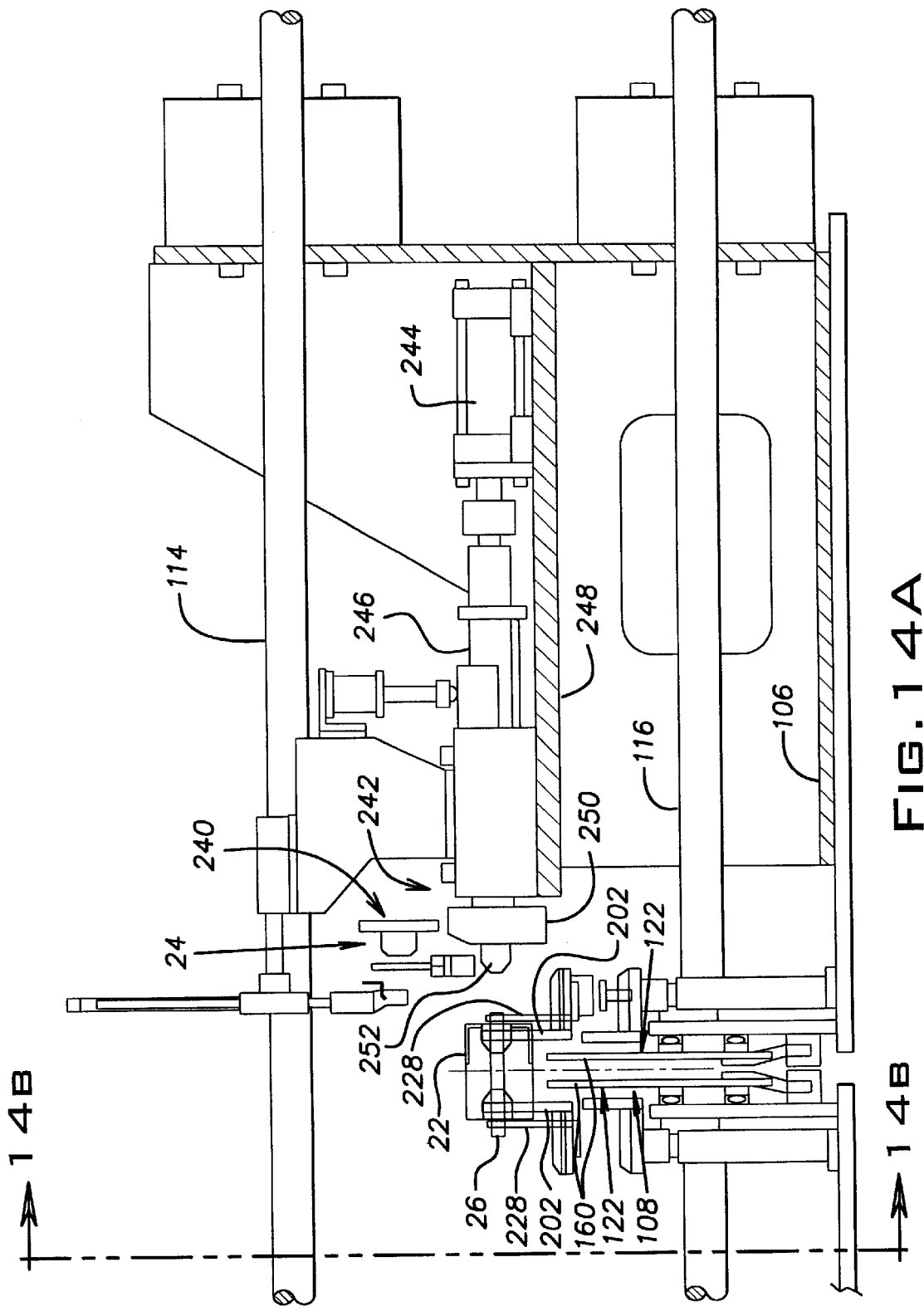

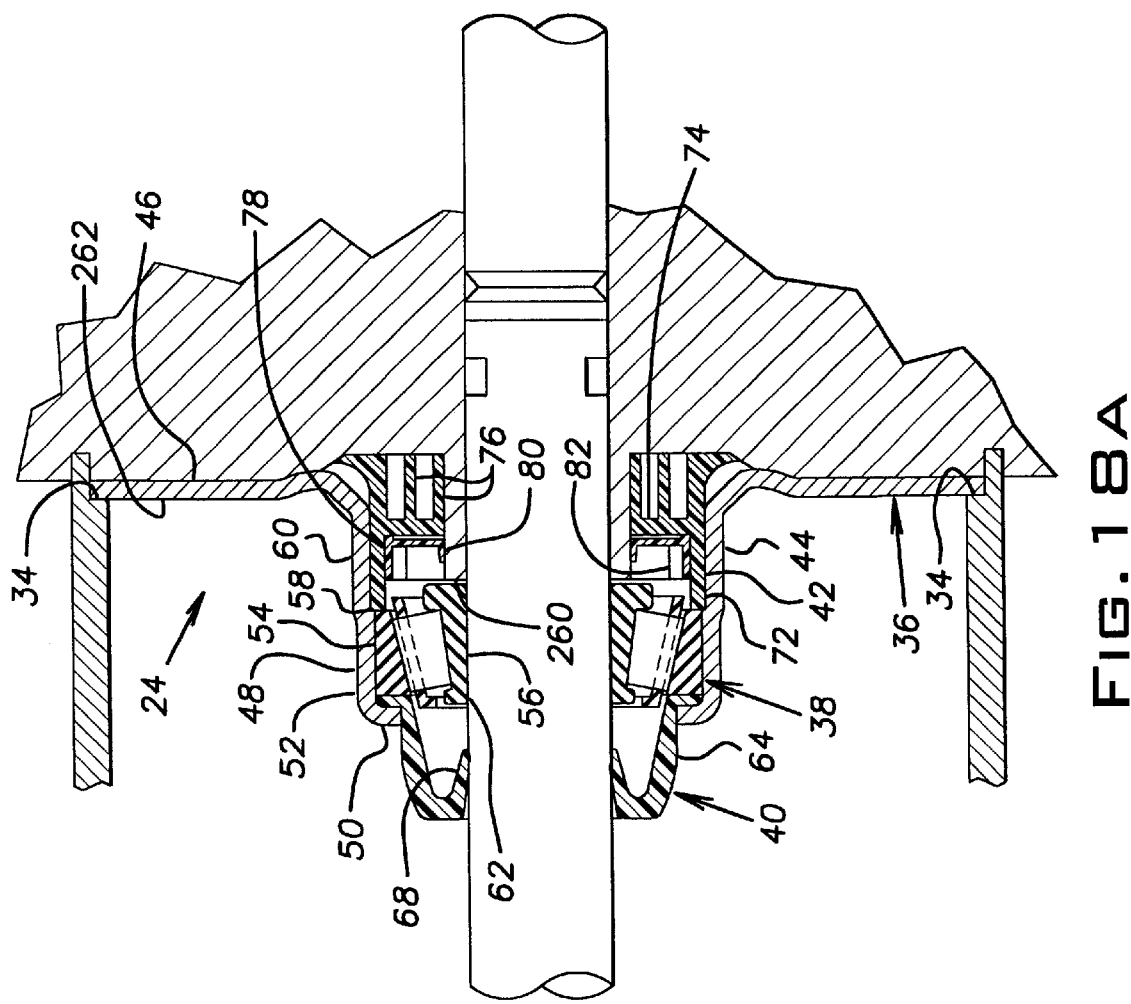

IDLER ROLL BEARING ASSEMBLY

This application claims priority based on U.S. Provisional Application Ser. No. 60/148,197, filed Aug. 10, 1999.

BACKGROUND OF THE INVENTION

The present invention generally relates to idler rollers for conveyors and, more particularly, to bearing assemblies for such idler rollers.

A belt conveyor is conventionally supported between its ends by a plurality of carriers. Each carrier typically includes a frame extending transversely to the conveyor belt and journals generally three idler rolls in an end-to-end relationship. Generally, the intermediate idler roll is disposed in a horizontal position while the outer two idler rolls are disposed at an upwardly inclined angled relationship to a horizontal plane to give the conveyor belt a trough-like shape for the purpose of keeping a load centered on the conveyor belt.

The idler rolls typically have bearing assemblies, which are interposed between a rotating roller shell and a stationary shaft. While the bearing assemblies are commonly ball bearings, it is desirable for the bearing assemblies to be tapered roller bearings because they can provide twice the minimum life of ordinary ball bearings. The tapered roller bearings, however, require precise axial clearance settings. The tapered roller bearings have been secured with threaded assemblies and/or snap rings with compensating washers to account for manufacturing variations. Thus the idler rolls with tapered roller bearings are relatively complex to produce and are relatively expensive.

It is generally known to press various bearings onto various shafts. This is a rather simple and low-cost approach. The long shaft lengths of idler rolls, however, have made press fitting tapered roller bearings directly onto the metal shaft impractical because of the precise axial clearance seating required versus shaft flexibility and compressibility.

Accordingly, there is a need in the art for an idler bearing having tapered roller bearings that have precise and consistent end-play settings, is relatively easy to produce, and is affordably priced. There is also a need in the art for a method of producing such idler bearings and a device for automatically producing a high volume of such idler rolls.

BRIEF DESCRIPTION OF THE SEVERAL VIEWS OF THE DRAWING

These and further features of the present invention will be apparent with reference to the following description and drawings, wherein:

FIG. 6 is an enlarged front elevational view, partly in cross-section, showing a shell of the idler roll of FIG. 2;

FIG. 7 is an enlarged front elevational view, in cross-section, showing a head assembly of the idler roll of FIG. 2;

FIG. 8 is an enlarged front elevational view showing a shaft of the idler roll of FIG. 2;

FIG. 9 is a cross-sectional view showing a multi-station machine for assembling the idler roll of FIG. 2, the plane of the section being indicated by the line 9—9 in FIG. 9a;

FIGS. 10 and 11 are side elevational views similar to FIG. 9 but showing the machine in progressively indexed positions during assembly of the idler roll;

FIG. 14 is a cross-sectional view, the plane of the section being indicated by the line 14—14 in FIG. 9a;

FIG. 14a is an enlarged fragmentary view of a portion of the assembly shown in FIG. 14;

FIG. 14b is a cross-sectional view, the plane of the section being indicated by the line 14b—14b in FIG. 14a;

FIG. 18a is a view similar to FIG. 18 but showing a later stage of the press fit operation;

FIG. 19 is a cross-sectional view, the plane of the section being indicated by the line 19—19 in FIG. 9a;

DETAILED DESCRIPTION OF PREFERRED EMBODIMENTS

Figure 1:
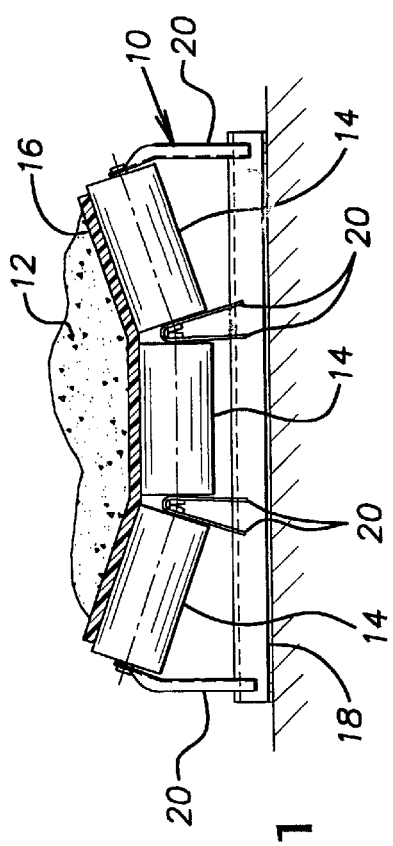
FIG. 1 is a sectional view of an idler roll assembly for a troughing belt conveyor loaded with bulk material according to the present invention.

FIG. 1 illustrates an idler roll assembly 10 of a troughing belt conveyor loaded with bulk material 12. The idler roll assembly 10 includes three idler rolls 14 for supporting a conveyor belt 16 and a rigid carrier frame 18 for supporting the idler rolls 14. The carrier frame 18 has a plurality of vertically disposed frame members 20 supporting ends of the idler rolls 14. While the invention is illustrated as being applied to three roll troughing idlers, it should be appreciated that the invention is also applicable to flat return rolls and idler rolls in general.

Each of the idler rolls 14 are preferably constructed in an identical manner, therefore, only will be described in detail hereinafter. As best shown in FIGS. 2–5, each idler roll 14 includes a roll cylinder or shell 22, a pair of end or head assemblies 24, a shaft 26, and a pair of exterior shields 28.

As best shown in FIG. 6, the roll shell 22 preferably has a wall 30 forming a hollow cylinder with open ends. The wall 30 is provided with a counterbore 32 at each end to form opposed annular shaped and outward facing abutments 34. The counterbore 32 is sized to form a seat for and press fit with the head assembly 24 as described in more detail hereinafter. The roll shell 22 typically has an outer diameter of about 4 inches to about 6 inches, a length of about 5 inches to about 81 inches, a wall thickness of about 0.148 inches to about 0.250 inches (about 9 to about ¼ tube gauge).

As best shown in FIG. 7, each head assembly 24 includes a roll end or head 36, a bearing assembly 38, a back or inside seal 40, an outside seal 42, and a lip seal 44. The roll head 36 has a cap portion 46 and an integral hub portion 48 inwardly extending from the cap portion 46 to form a recess for receiving the bearing assembly 38. The cap portion 46 is sized and shaped to be press fit into the counterbore 32 of the. roll shell 22. The cap portion 46 has an outer diameter sized for an interference fit with the roll shell 22, such as an interference of preferably about 0.002 to about 0.010 inches and more preferably about 0.005 to about 0.008 inches. For example, a roll shell 22 having an outer diameter of 5 inches can have a counterbore diameter of 4.817/4.820 inches to mate with a roll head 36 having an outer diameter of 4.822/4.827. The hub portion 48 is generally cylindrical-shaped and is sized to form a seat for and press fit with the bearing assembly 38 as described in more detail hereinafter. The inner or free end of the hub portion 48 is provided with a lip or flange 50. The flange 50 extends radially inward to form an outwardly facing abutment 52 at the rear of the recess formed by the hub portion 48.

The bearing assembly 38 is preferably a single row, straight bore tapered roller bearing including an outer race or cup 54, an inner race or cone 56, a plurality of tapered rollers 58 between the cup 54 and the cone 56, and a cage 60 for the rollers 58. The bearing assembly may contain ball bearings. The cup 54 has an outer diameter sized to be press fit into the recess of the roll head hub portion 48. Preferably, the cup 54 has an outer diameter sized for an interference fit with the roll head hub portion 48 such as an interference of about 0.005 to about 0.008 inches. The cone 56 has an inner diameter sized to form a press fit with the shaft 26 as described in more detail hereinafter. The bearing assembly can be a standard type TS bearing with class 4 tolerances but preferably has a front face radius or chamber 62 which allows the cone 56 to be pressed over the shaft 26 with an interference, preferably of up to about 0.003 inches, without shaving a burr off of the shaft 26. For example, a ¾ inch bearing assembly 38 can have a front face radius 62 of about 0.03 inches to about 0.05 inches or a front face chamber can have an angle of about 15° and a depth up to about 0.05 inches.

The back seal 40 is adapted to provide protection for the bearing's grease reservoir at the rear or inner side of the bearing assembly 38. The back seal 40 is sized and shaped to generally close the annular shaped gap between the hub portion 48 of the roll head 36 and the shaft 26. The back seal 40 preferably has a generally tubular-shaped main wall 64, a radially outwardly extending flange 66 extending from a forward end of the main wall 64, and a radially inward extending lip 68. The flange 66 is sized to be held between the flange 50 of the roll head hub portion 48 and the rear end of the bearing assembly cup 54. Preferably, the back seal flange 66 is compressed between the flange 50 of the roll head hub portion 48 and the rear end of the bearing assembly cup so that it is rigidly held thereto for rotation therewith. The lip 68 is sized and shaped to engage the stationary shaft 26. The back seal 40 can be formed from any suitable resilient material such as, for example, an elastomer.

The outside seal 42 is adapted to cooperate with the exterior shield 28 to form a labyrinth passage 70 which retards lateral movement of contaminants and to utilize the natural centrifugal forces of the rotating idler roll 14 to redirect potential contaminants away from the labyrinth passage 70, that is to act as a flinger. The outside seal 42 preferably has a generally tubular shaped main wall 72, a radially inwardly extending flange 74 extending from the main wall 72, and a plurality of forwardly extending fingers 76 extending from the forward side of the flange 74. The main wall 72 is sized to engage the inner diameter of the hub portion 48 of the roll head 36 when inserted therein. Preferably, the main wall 72 has an outer diameter sized for at least a tight press fit with the inner diameter of the roll head hub portion 48 so that it is rigidly held thereto for rotation therewith. The main wall 72 preferably has a length sized to extend from the forward end of the bearing cup 54 to a plane forward of the roll head 36 so that the forward end of the main wall 72 is cantilevered from the roll head hub portion 48. The free forward end of the main wall 72 is sized and shaped to redirect potential contaminants radially outward away from the main wall 72 and the labyrinth passage 70 by utilizing centrifugal forces. In this regard, the outer surface of the main wall 72 curves radially outward in a forward direction at the forward end of the main wall 72. The cylindrically shaped fingers 76 are concentric and spaced apart and are sized and shaped to cooperate with the exterior shield 28 to form the labyrinth passage 70. The outside seal 42 can be formed from any suitable material such as, for example, a molded thermoplastic material.

The lip seal 44 is located between the flange 74 of the outside seal 42 and the forward end of the bearing assembly 38 and is adapted to provide further protection against intrusion by contaminants. The lip seal 44 is sized and shaped to generally close the annular shaped gap formed between the main wall 72 of the outer seal 42 and the shaft 26 rearward of the labyrinth passage 70. The lip seal 44 preferably has a tubular shaped main wall 78 and a radially inward extending lip 80 extending from the forward end of the main wall 78. The main wall 78 is sized to engage the inner diameter of the outer seal main wall 72 when inserted therein. An anchoring ring or insert 82 is provided at the inner diameter of the main wall 78 which is sized to compress the main wall 78 of the lip seal 44 against the main wall 72 of the outside seal 42 so that it is rigidly held thereto for rotation therewith. The lip 80 is sized and shaped to engage the exterior shield 28. The lip seal 44 can be formed from any suitable resilient material such as, for example, an elastomer.

Figure 2:
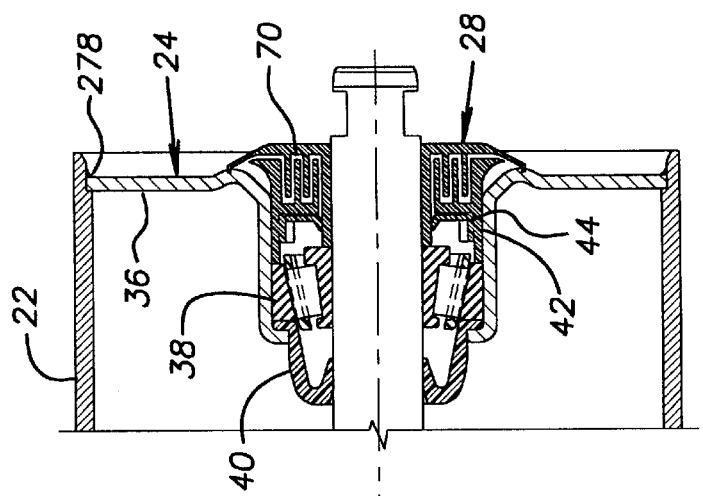
FIG. 2 is an enlarged front elevational view, partly in cross section, showing a single idler roll of the idler roll assembly of FIG. 1.
Figure 3:
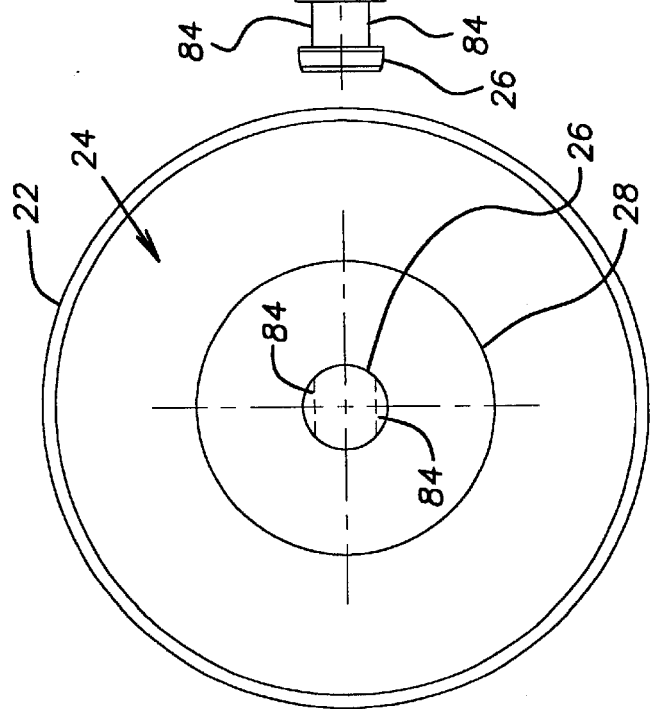
FIG. 3 is a side view of the idler roll of FIG. 2.
Figure 4:
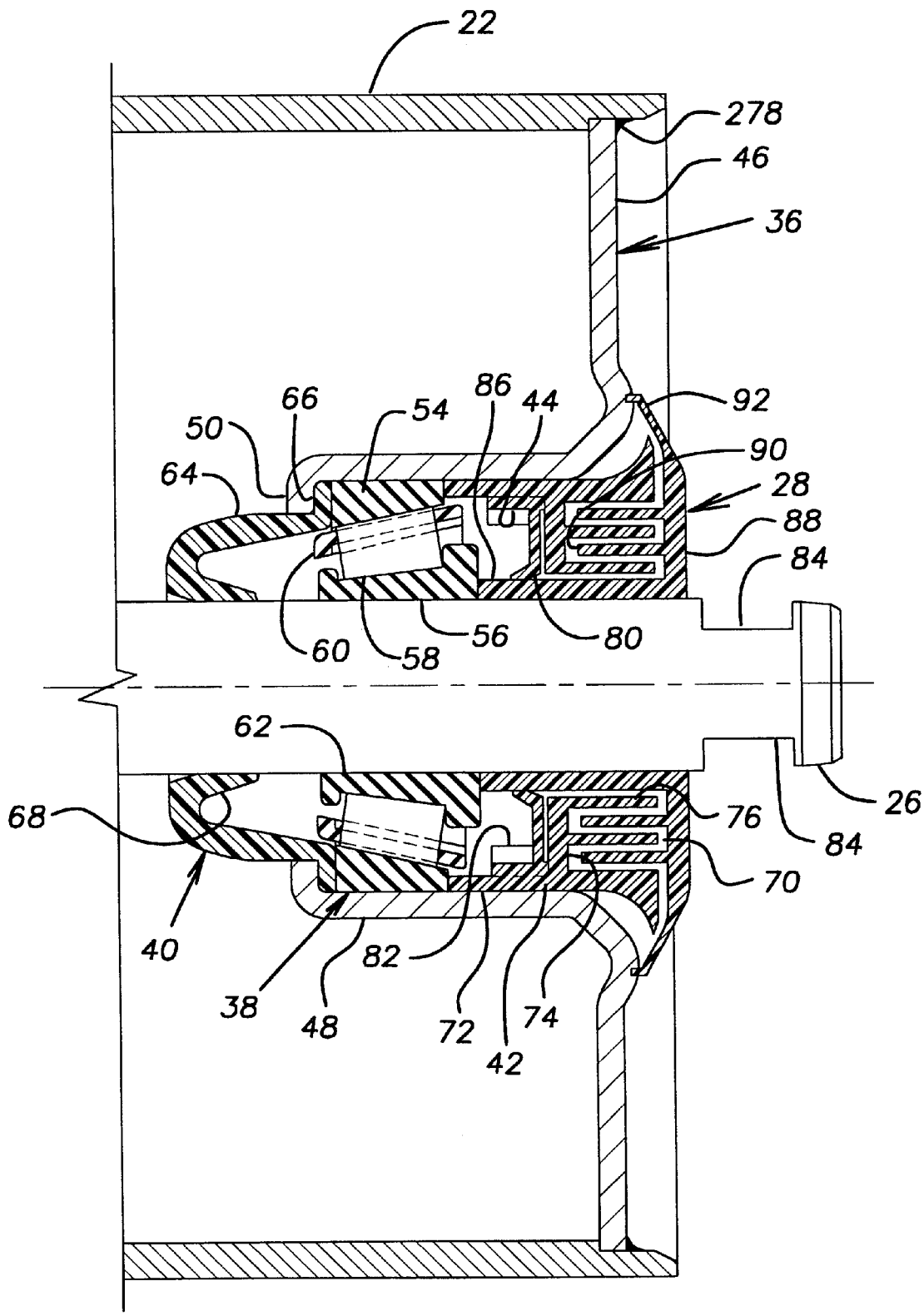
FIG. 4 is an enlarged front elevational view, in cross section, showing one end of the idler roll of FIG. 2.
Figure 5:
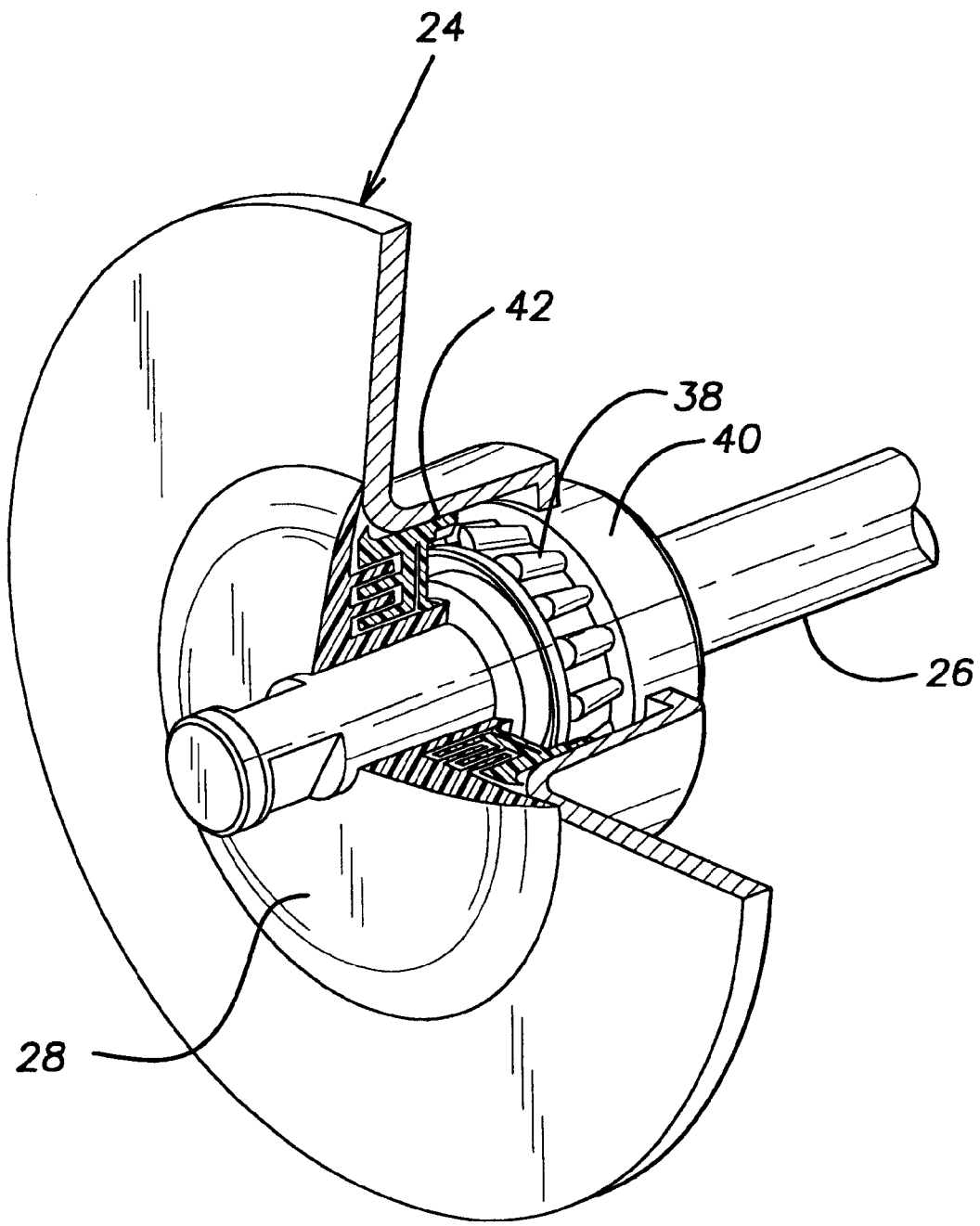
FIG. 5 is an enlarged perspective view of one end of the idler roll of FIG. 2 with portions cut away and the shell removed for clarity.

As best shown in FIGS. 2 and 8, the shaft 26 is a solid bar preferably having a length greater than the roll shell 22 and a constant outer diameter sized for a press fit with the bearing assembly cone 56. The shaft 26 may be a hollow and/or an end point shaft without departing from the invention. The illustrated shaft 26 is provided with a pair of opposed flats 84 on each end for cooperating with the frame members 20 of the carrier frame 18. Typically, the shaft 26 has a length of about 8⅜ inches to about 58⅜ inches for a roll shell 22 having lengths of 7 inches to 57 inches. The shaft 26 preferably has an outer diameter sized for an interference fit with the bearing cup 54 such as an interference of up to about 0.003 inches and more preferably an interference of up to about 0.0005 inches to about 0.0030 inches. For example, a bearing cone 56 having an inner diameter of 0.750+0.0005/−0.0000 inches can mate with a shaft 26 having an outer diameter of 0.7510/0.7530 inches. The shaft can be formed from any suitable material such as, for example, C1018 or C1040 steel or the like.

As best shown in FIGS. 2–5, the exterior shield 28 is adapted to cooperate with the outside seal 42 to form the labyrinth passage 70 which retards lateral movement of contaminants and is adapted to close the outer end of the idler roll 14. The exterior shield 28 is sized and shaped to generally close the annular shaped gap between the roll head 36 and the shaft 26 at the end of the idler roll 14. The exterior shield 28 preferably has a generally tubular shaped main wall 86, a radially outwardly extending flange 88 extending from the forward end of the main wall 86, a plurality of rearwardly extending fingers 90 extending from the rearward side of the flange 88, and an inwardly extending lip 92 extending from the free outer end of the flange. The main wall 86 is sized to engage the outer diameter of the shaft 26 when inserted thereon. Preferably, the main wall 86 has an inner diameter sized for at least a tight press fit with the shaft 26 so that it is rigidly held thereto and stationary therewith. The main wall 86 preferably has a length sized to extend from the forward end of the bearing cone 56 to a plane forward of the outside seal fingers 76. The cylindrically-shaped fingers 90 are concentric and spaced apart and are sized and shaped to cooperate with the fingers 76 of the outside seal 42 to form the labyrinth passage 70. The lip 92 is sized and shaped to engage the forward or outer surface of the rotating cap portion 46 of the roll head 36. The exterior shield 28 can be formed from any suitable material such as, for example, at least in part a molded thermoplastic material.

FIGS. 9–22 illustrate a multi-station assembly machine 100 for automatically producing a high volume of the idler rolls 14. The machine 100 includes ten stations, but a greater or lesser number of stations can be utilized within the scope of the invention.

The machine 100 includes a base frame 102 having a stationary frame 104 and a moveable frame 106 mounted thereon. The moveable frame 106 is mounted on tracks 108 for movement between solid and phantom outline positions illustrated in FIG. 14. Movement of the frame 106 is effected by a motor 110 mounted on the base frame 102 which drives a threaded shaft 112. The shaft 102 is threaded through a guide block 111 fixed to the frame 106 to move the frame 106 along the tracks 108 and relative to upper and lower guide shafts 114 and 116, respectively.

Figure 9A:
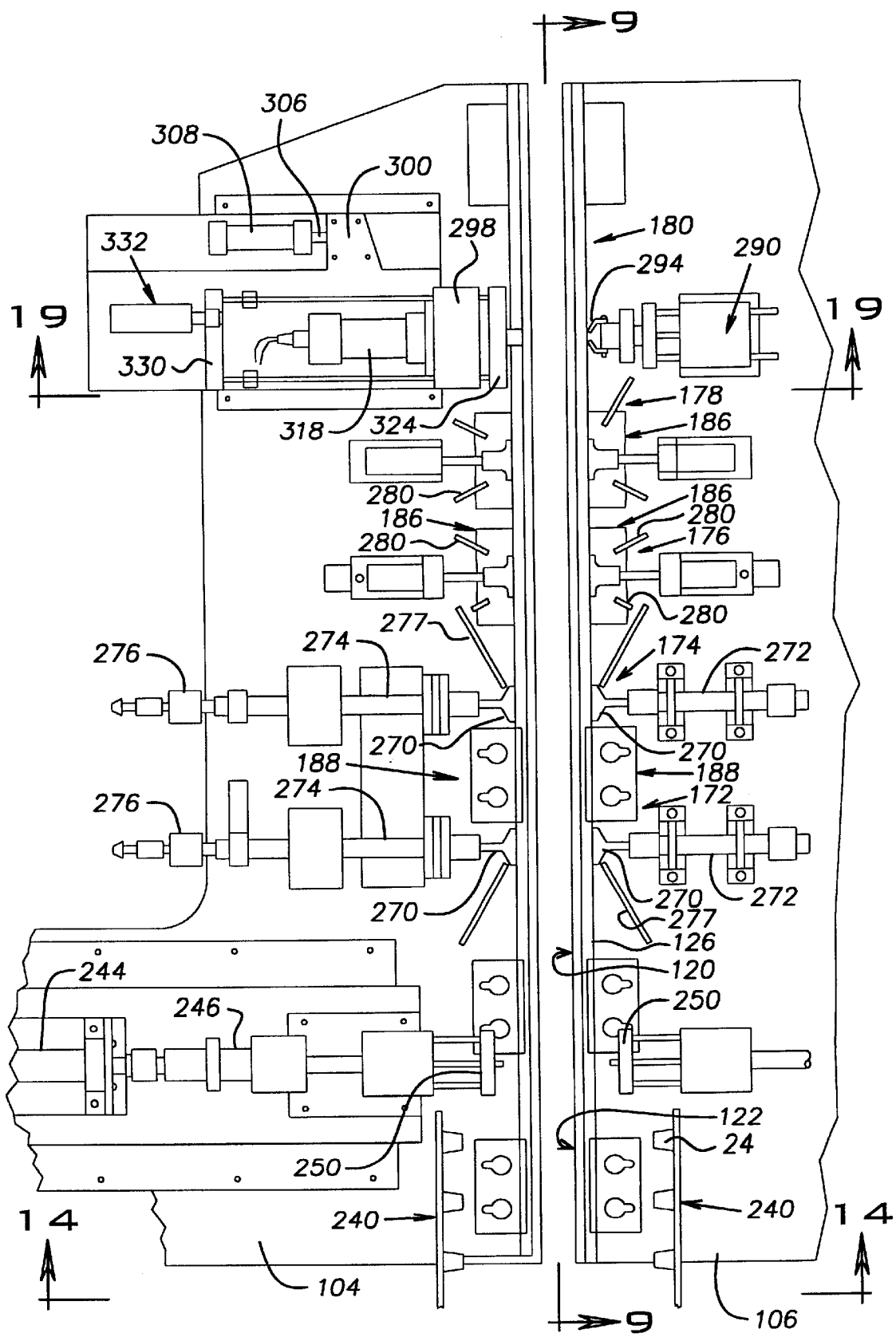
FIG. 9a is a top plan view of the multi-station machine.
Figure 9:
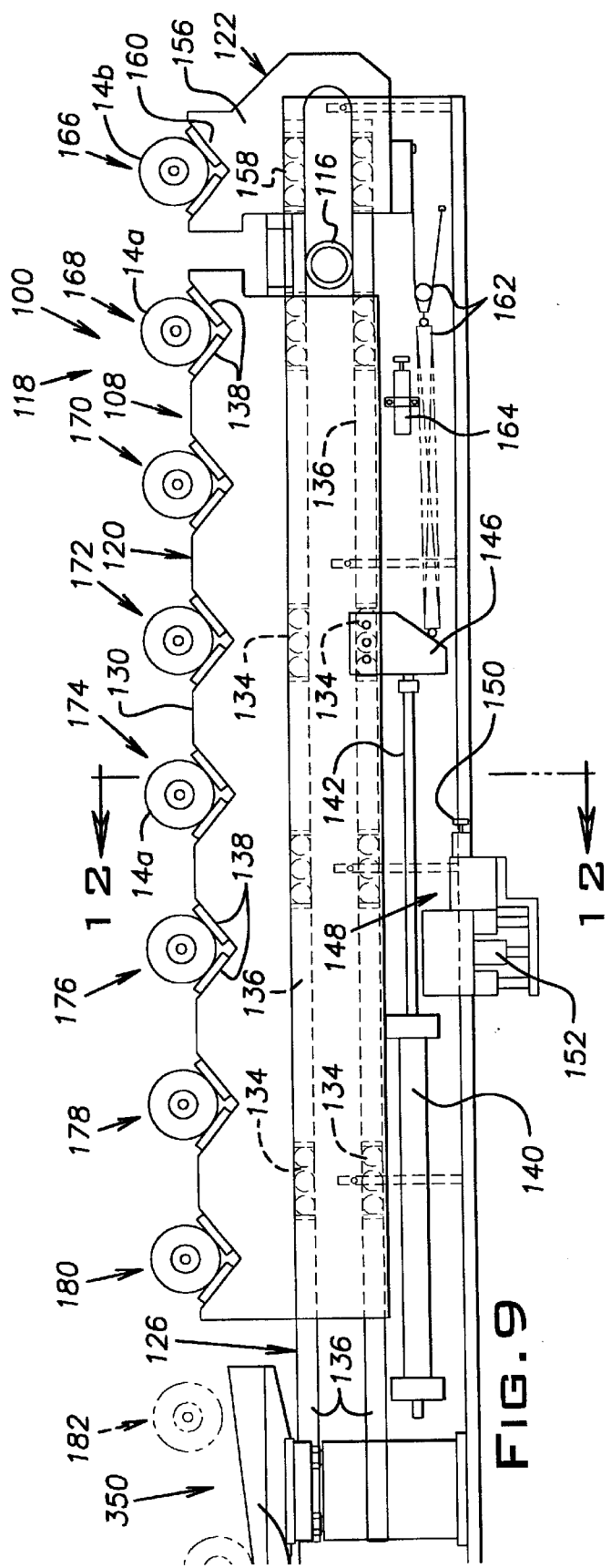
Figure 13:
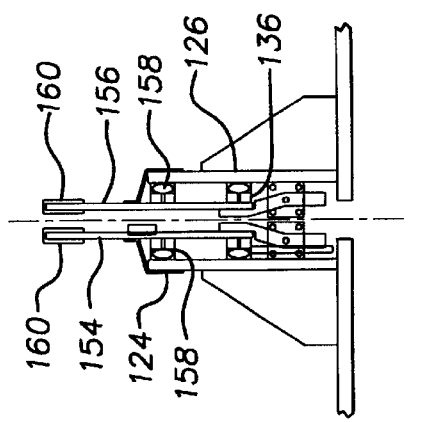
FIG. 13 is an end view of the machine.
Figure 12:
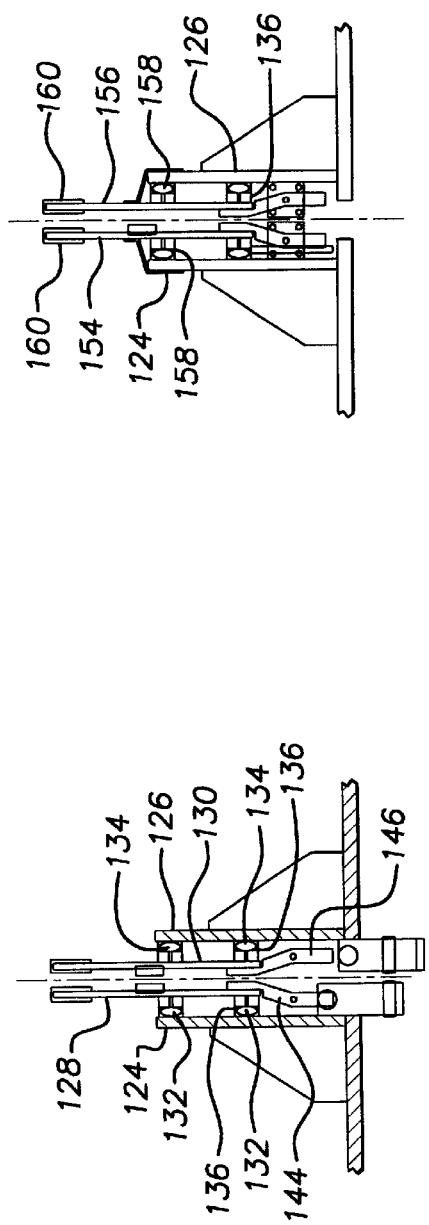
FIG. 12 is a cross-sectional view, the plane of the section being indicated by the line 12—12 in FIG. 9.

As may best be seen in FIGS. 9–11, an indexing shuttle 118 is provided. The indexing shuttle 118 comprises a main shuttle 120 and a feed shuttle 122. The main shuttle 120 includes a plate frame 124 mounted on the stationary frame 104 and a plate frame 126 mounted on the moveable frame 106. A carriage frame 128 is mounted for reciprocal movement on the plate frame 124, and a carriage frame 130 is mounted for reciprocal movement on the plate frame 126. To this end, the carriage frames 128 and 130 are provided with laterally extending rollers 132 and 134, respectively, which roll in tracks 136 on the plate frames 124 and 126. The carriage frames 128 and 130 are provided with a series of aligned roll cradles 138 which are adapted to receive and support an idler roll 14a being assembled.

An indexing mechanism is provided to index the carriage frames 128 and 130, in unison, from the position illustrated in FIG. 9, to the position illustrated in FIG. 10, to the position illustrated in FIG. 11, and back to the position illustrated in FIG. 9. The indexing mechanism includes a pair of pistons 140 each having a rod 142. One of the pistons 140 is fixed to the plate frame 126 (FIG. 9) and the other piston 140 is fixed to the plate frame 124. The rods 42 are connected to the carriage frames 128 and 130 by drive plates 144 and 146, respectively.

In order to shift the main shuttle 120 from the fully extended position shown in FIG. 9 to the partially retracted position shown in FIG. 10, a piston stop member 148 having a limit switch 150 is raised by a piston 152 to position the switch 150 in the path of the plate 146. When the plate 146 strikes the switch 150, the piston 140 is deactivated to remain in the position shown in FIG. 10. In this position, it will be noted that the main shuttle 120 has travelled a distance corresponding to the center-to-center spacing of the cradles 138. In a typical installation, this spacing is 12 inches and the maximum extension or retraction of the rod 142 is 24 inches.

In order to shift the main shuttle 120 from the partially retracted position shown in FIG. 10 to the fully retracted position shown in FIG. 11, the piston 152 of the piston stop member 148 is retracted to release the limit switch 150 from contact with the plate 146 and the rod 142 is permitted to fully retract in its piston 140.

The feed shuttle 122 includes a carriage frame 154 mounted for reciprocal movement on the plate frame 124 and a carriage frame 156 mounted for reciprocal movement on the plate frame 126. The carriage frames 154 and 156 are provided with laterally extending rollers 158 and 160, respectively, which roll in the tracks 136 on the plate frames 124 and 126. The carriage frames 154 and 156 are provided with aligned roll cradles 160 which are adapted to receive and support roll shells 14b being loaded into the assembly machine.

The feed shuttle 122 is adapted to reciprocate between the position shown in FIG. 9 to the position shown in FIGS. 10 and 11. The movement between these positions corresponds to the center-to-center spacing between the roll cradles 138. The feed shuttle 122 is retracted to the position shown in FIG. 9 by a piston (not shown) and is advanced to the position shown in FIGS. 10 and 11 by a spring and pulley mechanism 162 and a locating stop 164.

The assembly machine has a load station 166, a press cap station 168, an idle station 170, a first weld station 172, a second weld station 174, a first cool station 176, a second cool station 178, a check station 180, a first unload station 182, and a second unload station 184. Loading working, idling, cooling, and unloading operations are conducted at an elevated level, while the roll workpiece transport operations are performed by the described indexing mechanism. Lift units are provided at each station to raise the roll assembly out of its roll cradle 160 to a working position and to lower the roll back to its cradle and retract from the roll to permit the indexing mechanism to shift the roll to a downstream work station. Single lift units are provided at the load station 166 the cooling stations 176 and 178, and the check station 180 while double lift units 188 are provided at the press cap and idle stations 168 and 170, and at the weld stations 172 and 174. Each single lift unit 186 and each double lift unit 188 comprise identical end lift units 190 and 192, and 194 and 196, respectively. The end lift units 190 and 192 are mounted on the stationary frame 104 while the end lift units 194 and 196 are mounted on the moveable frame 106.

Figure 15A:
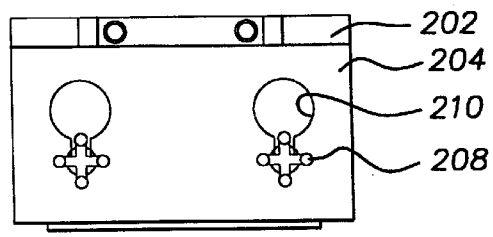
FIG. 15a is a plan view of the unit illustrated in FIG. 15.
Figure 15:
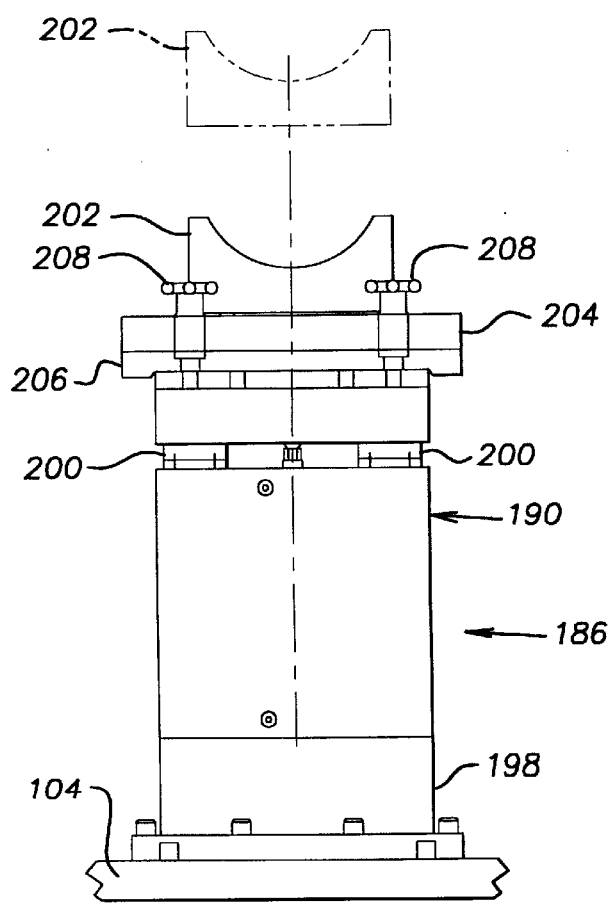
FIG. 15 is an elevational view of a single lift unit.

Referring to FIGS. 15 and 15a, the end lift 190 of a single lift unit 186 is illustrated. The end lift 190 comprises a base 198 fixed to the stationary frame 104. A pair of pistons 200 mounted on the base 198 are adapted to raise and lower a roll cradle 202 between a lowered position, shown in solid outline, and a raised position, shown in phantom outline. The cradle 202 is fixed to a mounting plate 204 which is removeably fixed to a platform 206 by screw knobs 208. Loosening of the knobs 208 permits the mounting plate 204 to be shifted so that the knobs 208 may clear apertures 210 in the plate 204. The cradle may then be replaced by a differently sized cradle to accommodate a differently sized idler roll 14.

Figure 17:
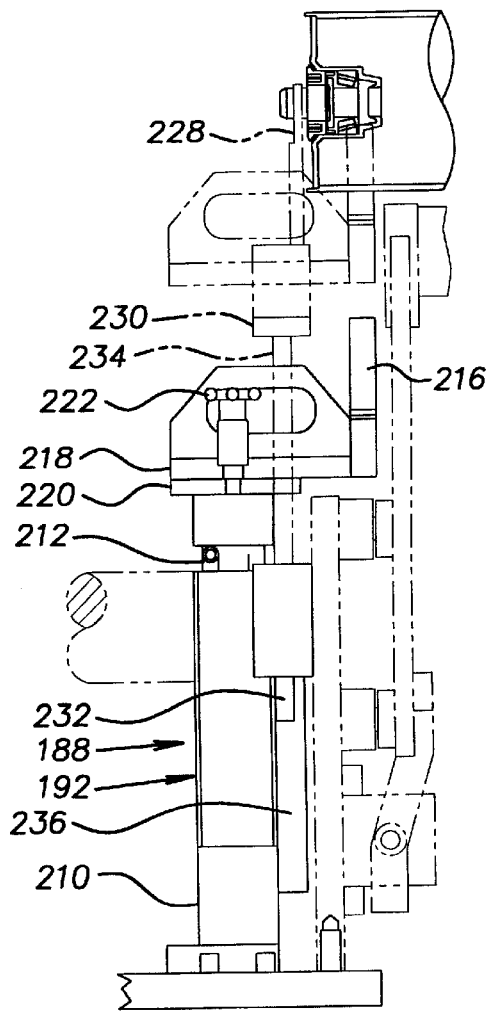
FIG. 17 is an end view of a double lift unit, the plane of the view being illustrated by the line 17—17 in FIG. 16.
Figure 16A:
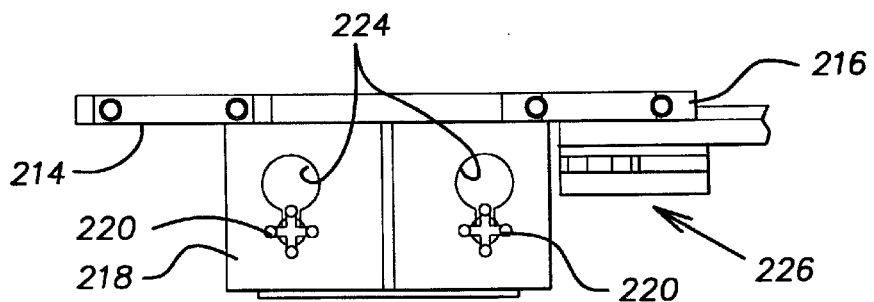
FIG. 16a is a plan view of the unit illustrated in FIG. 16.
Figure 16:
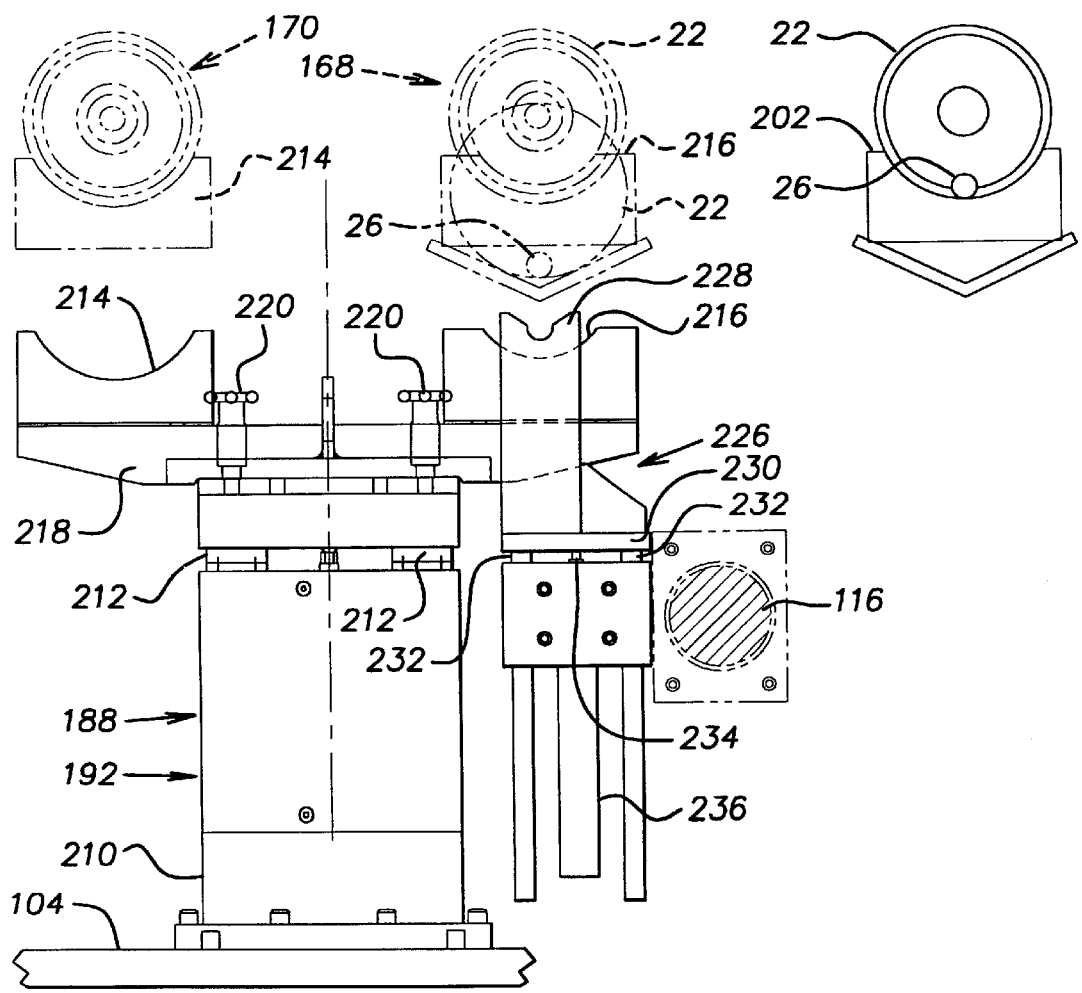
FIG. 16 is an elevational view of a double lift unit.
Figure 18:
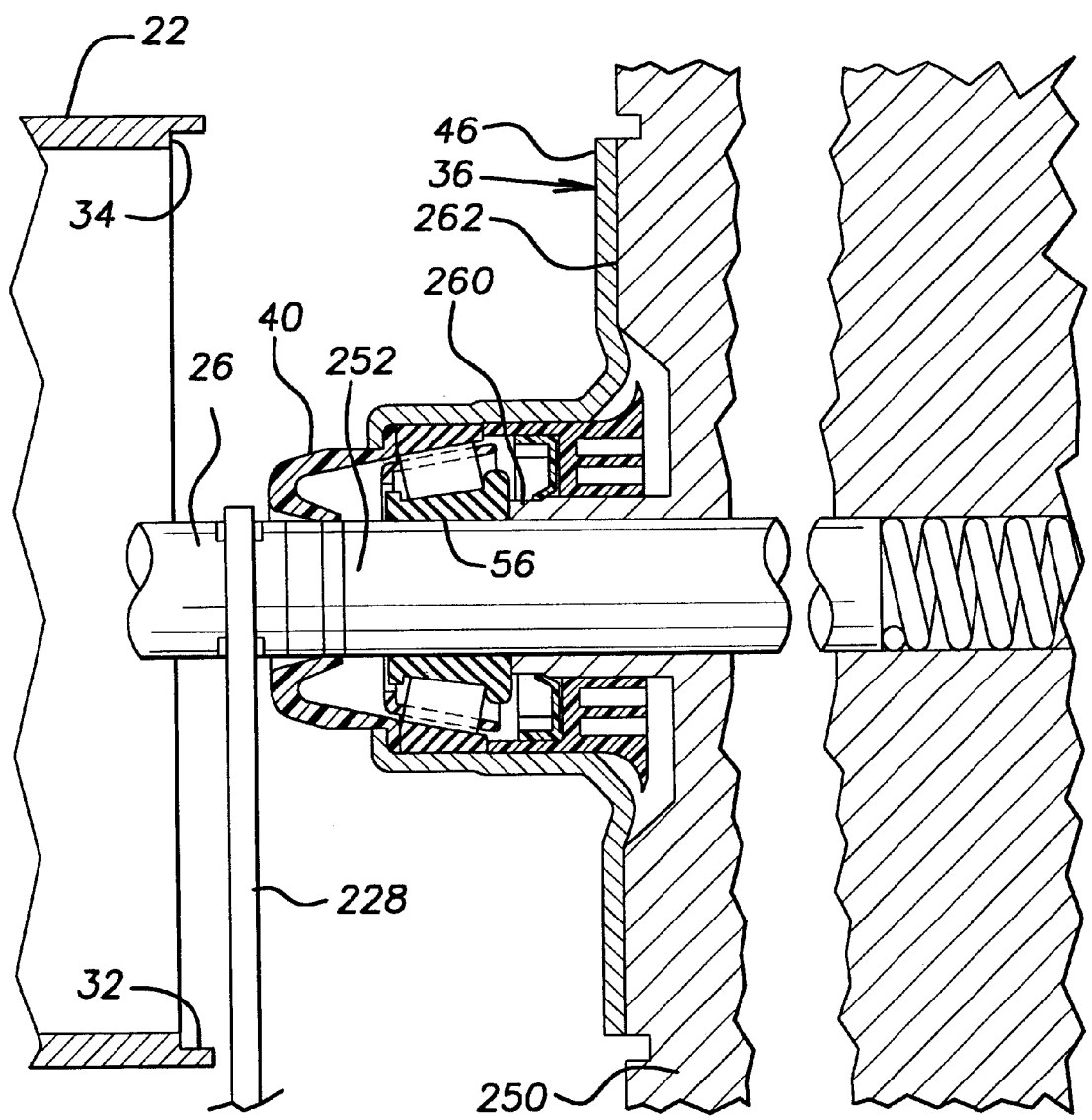
FIG. 18 is an enlarged cross-sectional view of a bearing being press fit on a roll shaft.
Figure 19:
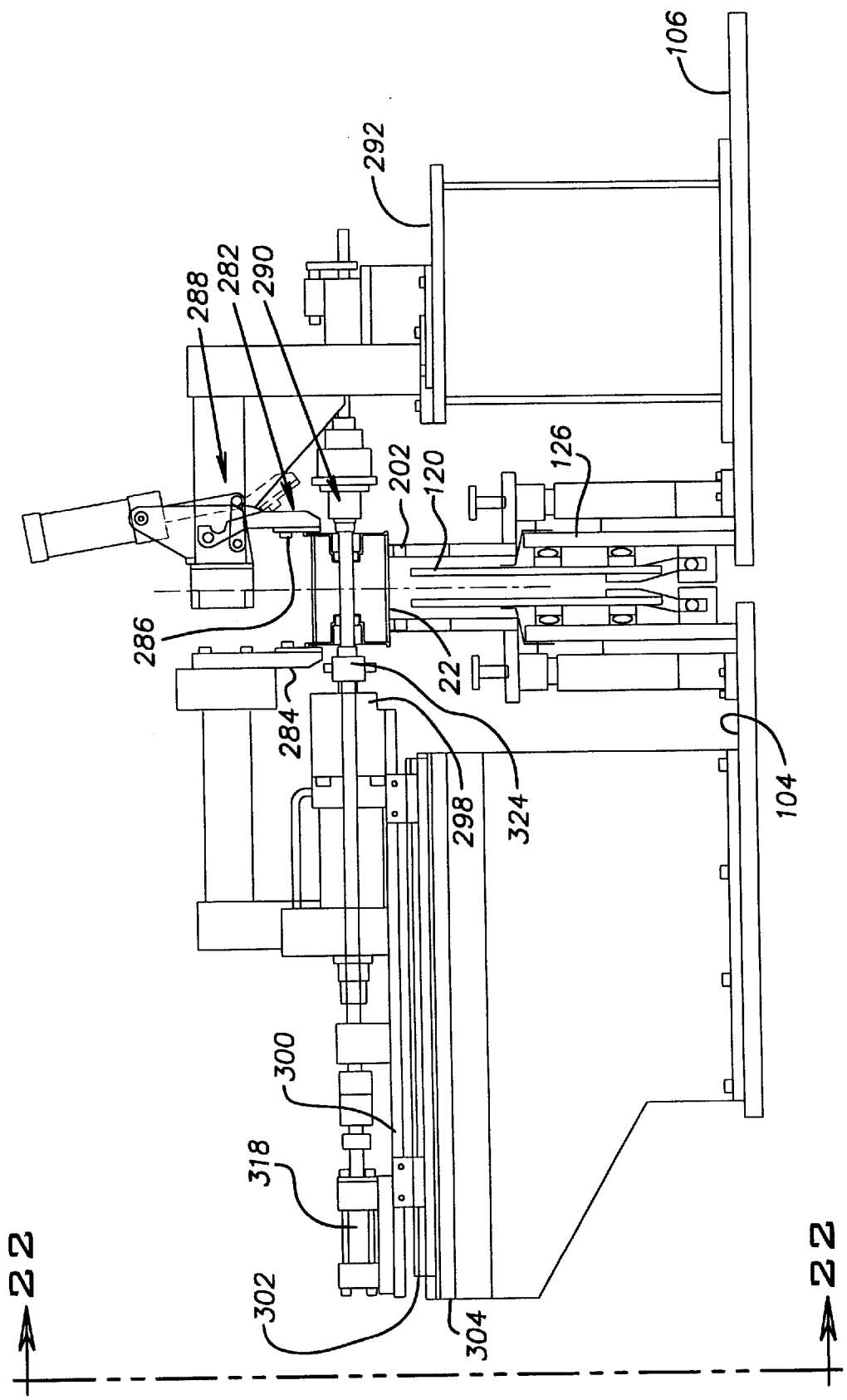
Figure 20:
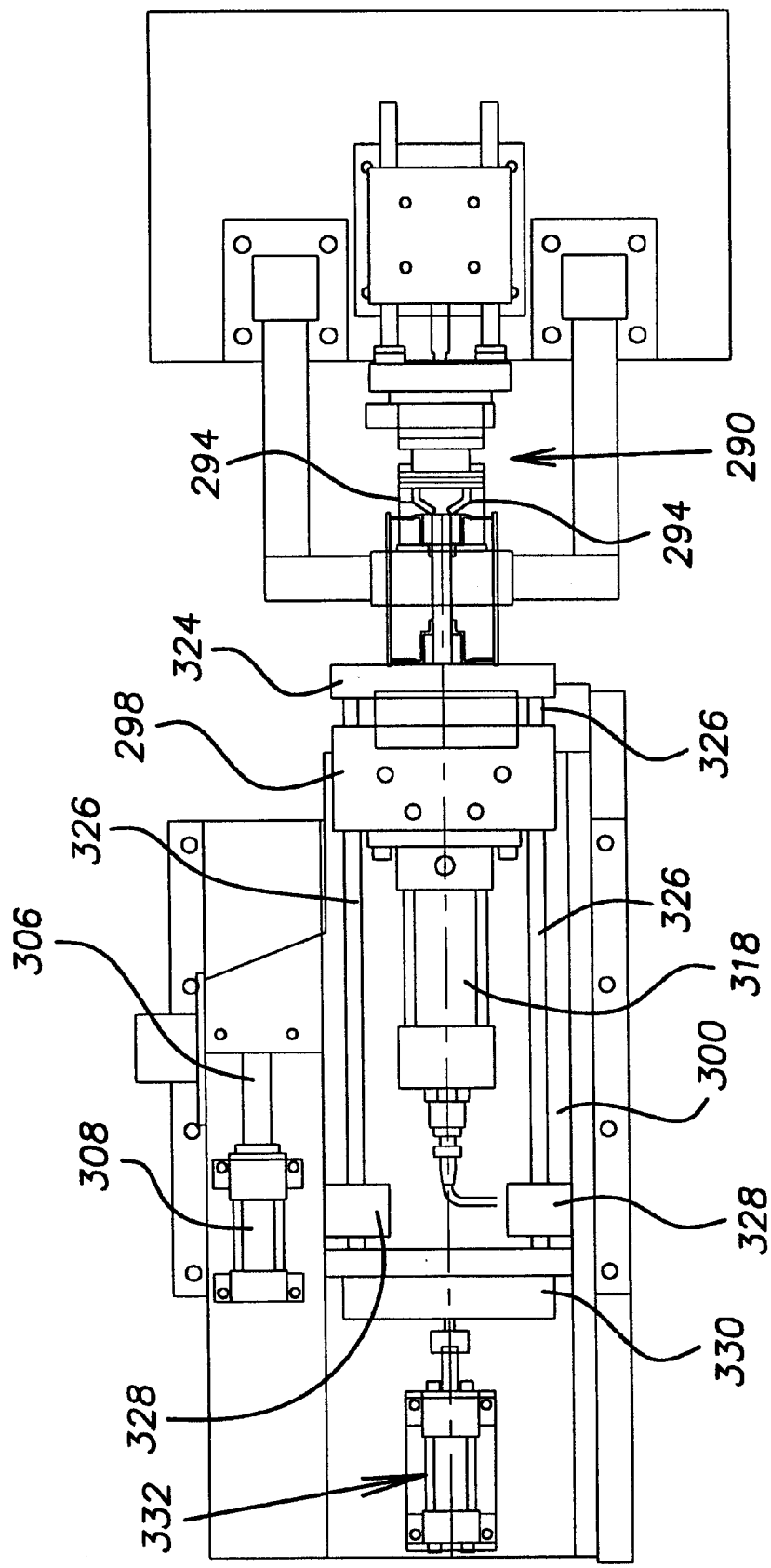
FIG. 20 is a plan view of the assembly shown in FIG. 19.

Referring to FIGS. 16, 16a and 17, the end lift 192 comprises a base 210 fixed to the stationary frame 104. A pair of pistons 212 mounted on the base are adapted to raise and lower a pair of roll cradles 214 and 216 between a lowered position, shown in solid outline, and a raised position, shown in phantom outline. The cradles 214 and 216 are fixed to a mounting plate 218 which is removeably fixed to a platform 220 by screw knobs 222. Loosening of the knobs 222 permits the mounting plate 218 to be shifted so that the knobs 222 may clear apertures 224 in the plate 218.

As described thus far, the double lift unit 188 at the weld stations 172 and 174 is identical to the lift unit 188 at the press cap station and idle station 168 and 170. At the press cap station 168, there is further provided a shaft lift and support mechanism 226. The mechanism 226 includes a shaft cradle 228 mounted on a platten 230. The platten 230 is mounted on guide rods 232 and on a rod 234 associated with a power piston 236. The power piston 236 is adapted to raise the shaft cradle from the position illustrated in solid outline in FIGS. 16 and 17 to the position illustrated in phantom outline.

Figure 14:
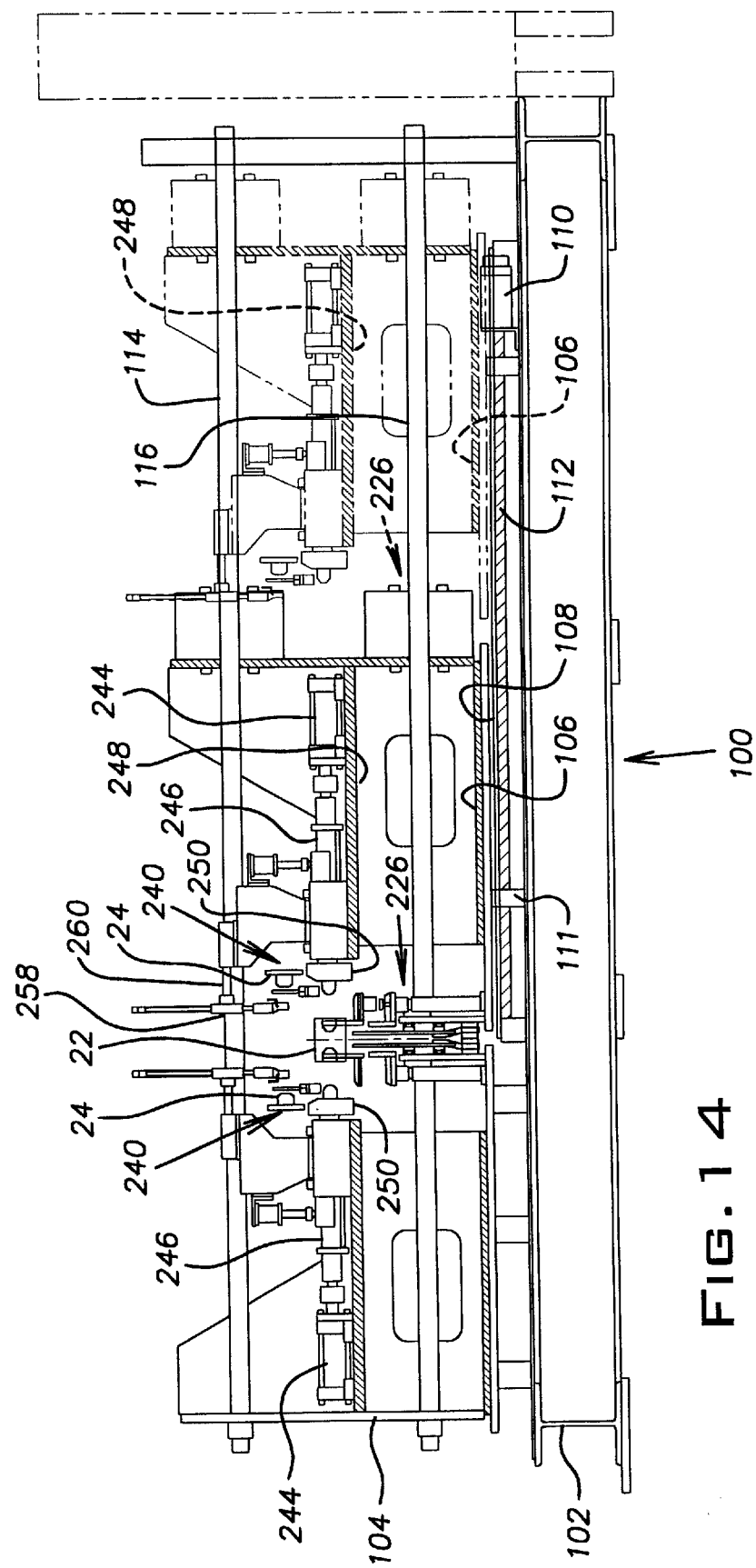
Figure 14B:
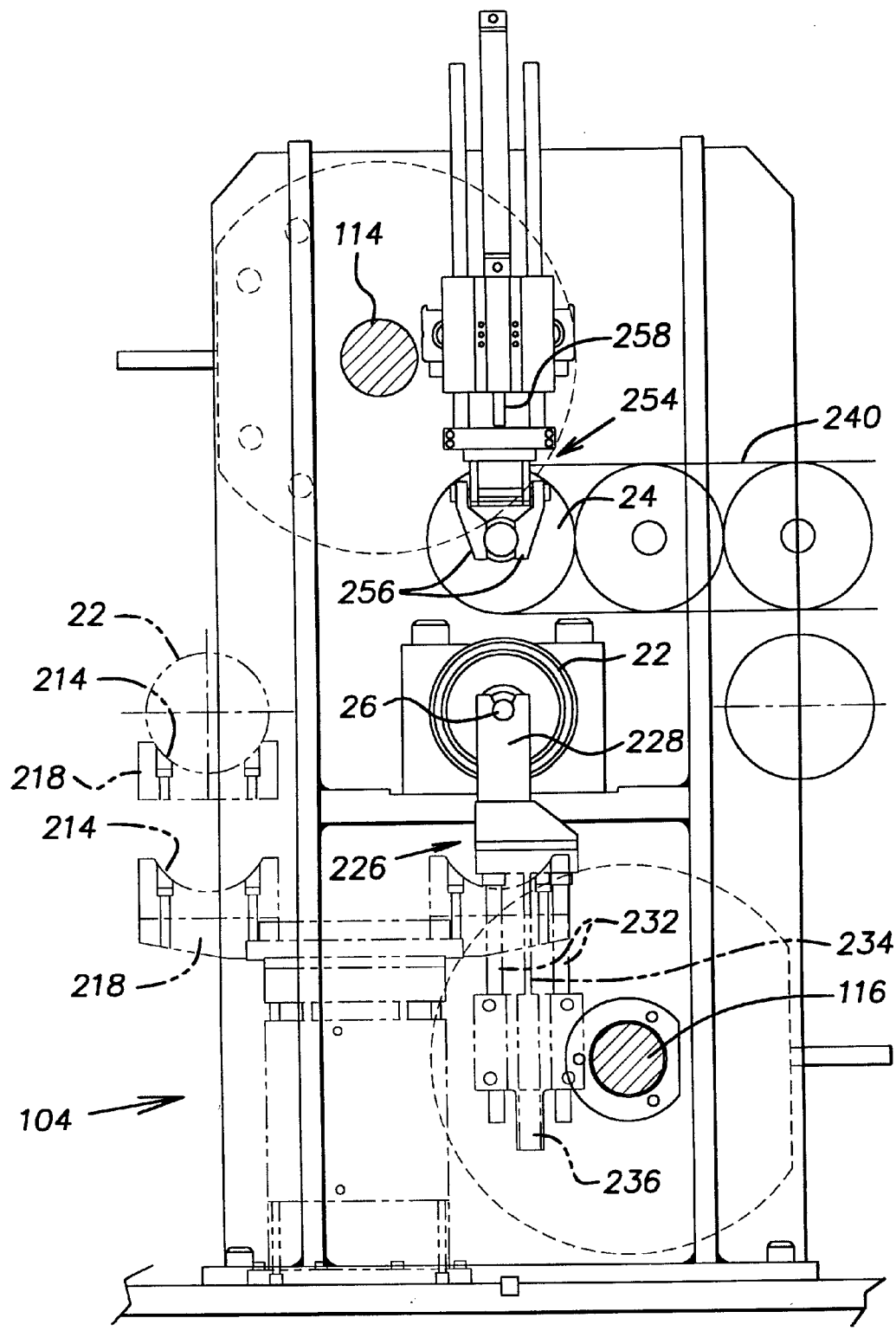

In order to describe the tooling and the assembly steps performed at the various workstations, the transport of a workpiece through the machine 100 from the loading station 166 to the unloading stations 182 and 184 will now be described. At the loading station 166, and with all of the single and double lift units 186 and 188 in their raised positions, a roll shell 22 is positioned in the roll cradles 202. Prior to such positioning, the moveable frame 106 is moved along the tracks 108 so that the roll cradles 138 are spaced apart a distance sufficient to accommodate the length of the shell 22 (generally, between about 5 and 81 inches). A shaft 26 is placed in the shell 22. The single lift unit 186 is lowered to place the shell 22 and the shaft 26 workpieces in the aligned roll cradles on the carriage frames 154 and 156 (see FIGS. 9 and 14). The main shuttle 120 and the feed shuttle are indexed from the position illustrated in FIG. 9 to the position illustrated in FIG. 10 in the previously described manner. The single and double lift units are activated to raise the shell 22 and the shaft 26 to the press cap station 168 as is shown in FIG. 14, 14a and 14b. It should be noted that while the roll cradles 202 lift the shell 22 from the aligned roll cradles 160, the shaft cradles 228 engage the ends of the shaft 26 to raise the shaft 26 to a centered position with respect to the shell 22.

At the press cap station 168, preassembled head assemblies 24 are delivered by a conveyor 240 and are pressed into the ends of the roll shell 22 and onto the ends of the shaft 26. There are provided axially aligned press cap assemblies 242 at the station 168. For purposes of simplicity, only the assembly 242 mounted on the moveable frame 106 is illustrated in FIG. 14a. The assembly 242 includes a cylinder 244 and ram 246 which are mounted on a platform 248 and which are adapted to advance a power head 250 toward and away from the roll shell 22.

The power head 250 has a spring loaded projecting shaft 252 which is adapted to be slideably received in the inner race 56 of the bearing. A robotic arm 254 having a gripping hand 256 is mounted on a piston 258 which in turn is mounted on a piston 260 for vertical and horizontal movement of the arm and hand 254 and 256. The hand 256 grasps a preassembled head assembly 24 from the conveyor 240, lowers the assembly and then translates horizontally to place the inner race 56 of the bearing over the projecting shaft 252. With the assembly 24 in place on the shaft 252, the power head 250 is advanced until the shaft 252 and the back seal 40 engage the roll shaft 26 (see FIG. 18). Since the shaft 26 is now supported, the shaft cradles 228 are lowered and the power head 250 is further advanced to press fit the cone 56 of the bearing assembly 38 onto the shaft 26 and to press the cap portion 46 of the roll head 36 into the counterbore 32 of the roll shell 22 (see FIG. 18a). The cone or inner race 56 is pushed by a nose 260 of the power head 250 while the cap portion 46 is pushed by a face portion 262 of the power head 250. The cap portion is pushed until it bottoms out against the counterbore abutments 34. The bearing cones 56, however, do not "bottom out" and in fact are pressed short of their theoretically desired locations. The end of the nose 260 which contacts the bearing assembly cone 56 is shortened a predetermined distance to leave a predetermined clearance within the bearing assembly 38 to compensate for manufacturing tolerances and any distortion that is created by later manufacturing operations such as welding.

Referring again to FIGS. 9–11, after completion of the operation at the press cap station 168, the double lift unit 188 is lowered to transfer the roll assembly to the end-most roll cradle 138 on the main shuttle 120 (FIG. 9). The main shuttle 120 is indexed a single station and the double lift unit is again raised to locate the roll assembly at the idle station 170 while various assembly and cooling operation are being conducted at the other stations.

After completion of those operations, the double lift unit 188 is lowered to again transfer the roll assembly to the end-most roll cradle 138 on the main shuttle 120 (FIG. 10). The main shuttle 120 is again indexed to the position shown in FIG. 11 and the double lift unit 188 at the weld stations 172 and 174 is raised to position the roll assembly at the first weld station 172.

Referring to FIG. 9a, the roll heads 36 of the shaft 26 are clamped between jaws 270. One set of jaws is mounted on a rotatable shaft 272 and the other jaw 270 is mounted on a rotatable shaft 274 which is driven by a motor 276. A welding head 277 is positioned at each end of the roll assembly in a position which enables a weld bead 278 to be deposited at the joint between the roll shell 22 and the end cap 36 (FIG. 2).

Prior to completion of the first welding operation at the weld station 172, the main shuttle 120 is indexed two positions back to the position illustrated in FIG. 9. With the main shuttle in this position, the double lift unit 188 at the welding stations 172 and 174 is lowered to deposit the roll assembly on the cradle 138, which is the third cradle from the right on the main frame 120, as viewed in FIG. 9. The main shuttle 120 is then indexed to the position illustrated in FIG. 10 with the workpiece now at the second weld station 174.

The double lift unit is again raised to position the workpiece at the second weld station 174, which is identical in structure to the station 172. A second weld bead is applied to the joint between the roll shell 22 and the end cap 46. The double lift unit 188 is then lowered to redeposit the welded roll assembly on the main shuttle 120 in the position illustrated in FIG. 10.

The main shuttle is indexed to the position illustrated in FIG. 11. The single left unit 186 at the first cooling station 176 is raised to position the welded workpiece at the cooling station 176. Cooling water is directed on the ends of the workpiece by spray jets 280. While the workpiece is at the cooling station 176, the main shuttle is indexed back to the position illustrated in FIG. 9 and the single lift unit 186 is lowered to deposit the workpiece in the fifth cradle 138 from the right as viewed in FIG. 9.

The main shuttle is indexed to the position shown in FIG. 10 and the single lift unit 186 at the station 178 is raised to position the workpiece at the second cooling station 178. The second cooling station 178 is identical to the station 176, and the workpiece is further cooled by the water jets 280 at that station.

It should be appreciated that, at this stage of the manufacturing operation, the precise location of the bearing assembly 38 on the shaft 26 for precise axial clearance is necessary because of the pressing, welding and cooling operations. This is particularly true for idler rolls having long shaft lengths, since flexibility and compressibility are directly proportional to shaft length and errors in bearing location are magnified when the bearing is press fit onto such shafts. This invention overcomes these positions by initially press fitting the bearings just short of their theoretically desired locations at the press cap station 168, as previously described, and then adjusting the bearing to precisely set the axial clearance of the bearing assemblies 38. The final adjustment of the bearing assemblies is accomplished at the press check station 180.

The workpiece is lowered from its position at the cooling station 178 and the main shuttle 120 is shifted to the position illustrated in FIG. 11. The single lift unit 186 at the press cap station is raised to position the workpiece at the press check station 180.

Referring now to FIGS. 19–22, the shell 22 is positioned at the press check station by the roll cradles 202 and by a shell clamp 282 which securely retains the shell against a fixed stop plate 284. The clamp 282 comprises a piston which operates a clamping jaw 286 through a toggle mechanism 288. An end of the shaft 26 is clamped by a rotatable clamping assembly 290 which is mounted on a table 292 fixed to the moveable frame 106. The clamping assembly 290 includes a pair of jaws 294 which are adapted to engage the opposed flats 84 at the end of the shaft 26. Since the flats 84 are positioned with respect to a vertical orientation, it is necessary to turn the shaft 26 to that orientation. A jaw rotating mechanism 294 is adapted to rotate the jaws 294 to a position which aligns the flats 84 in a vertical orientation.

With the flats 84 in this orientation, a pair of clamping jaws 296 grip the oriented flats 84 on the other end of the shaft 26. As may be seen in FIG. 21, the clamping jaws 296 are mounted on a clamping head 298 which in turn is mounted on a side platform 300 (see FIGS. 9 and 19). The platform 300 is mounted on slide rails 302 fixed to a table 304 mounted on the stationary frame 104 and is driven by a piston 306 associated with a cylinder 308 having a temposonic transducer on the table 304.

Figure 21:
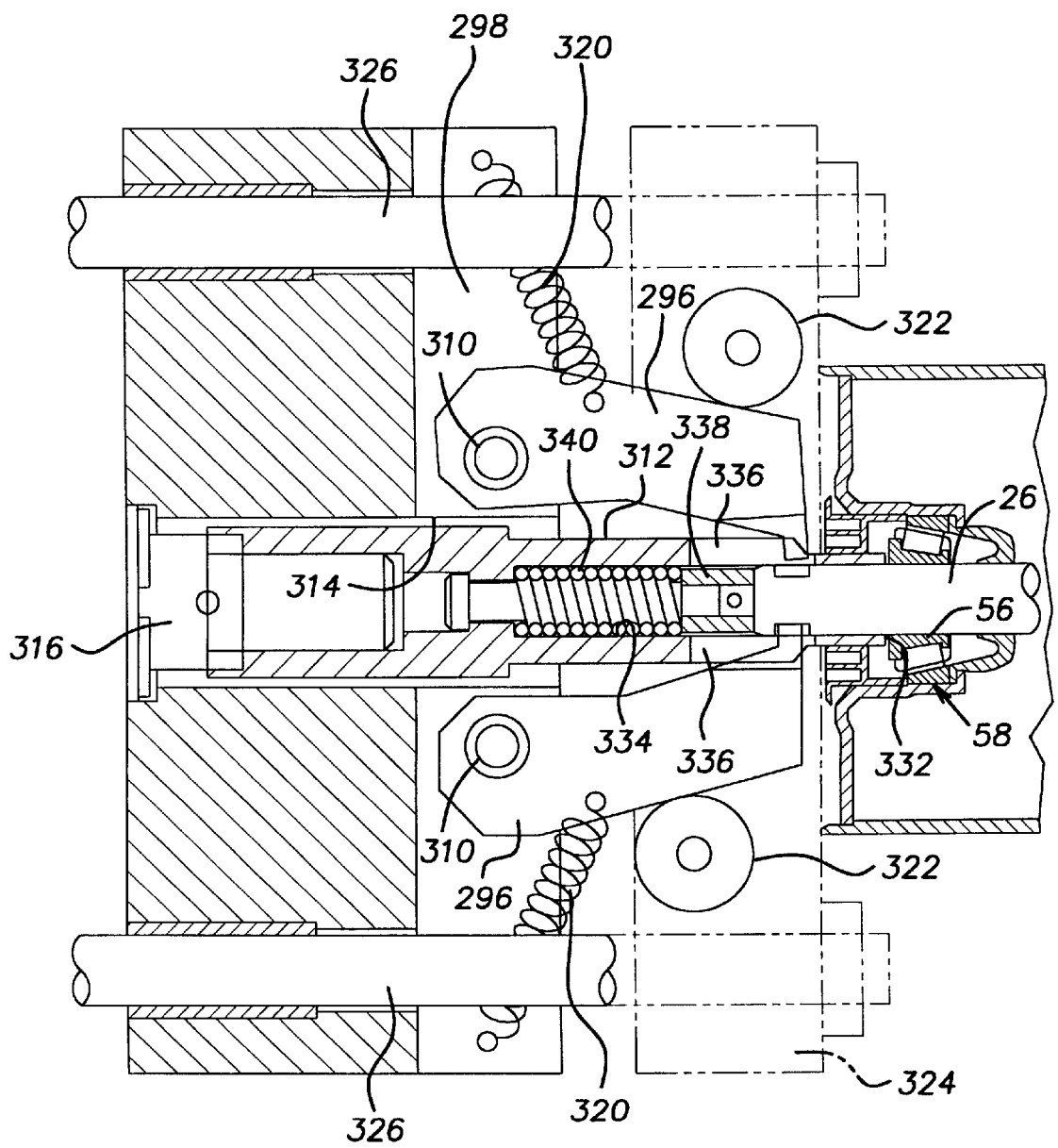
FIG. 21 is an enlarged plan view of the bearing press tool.
Figure 22:
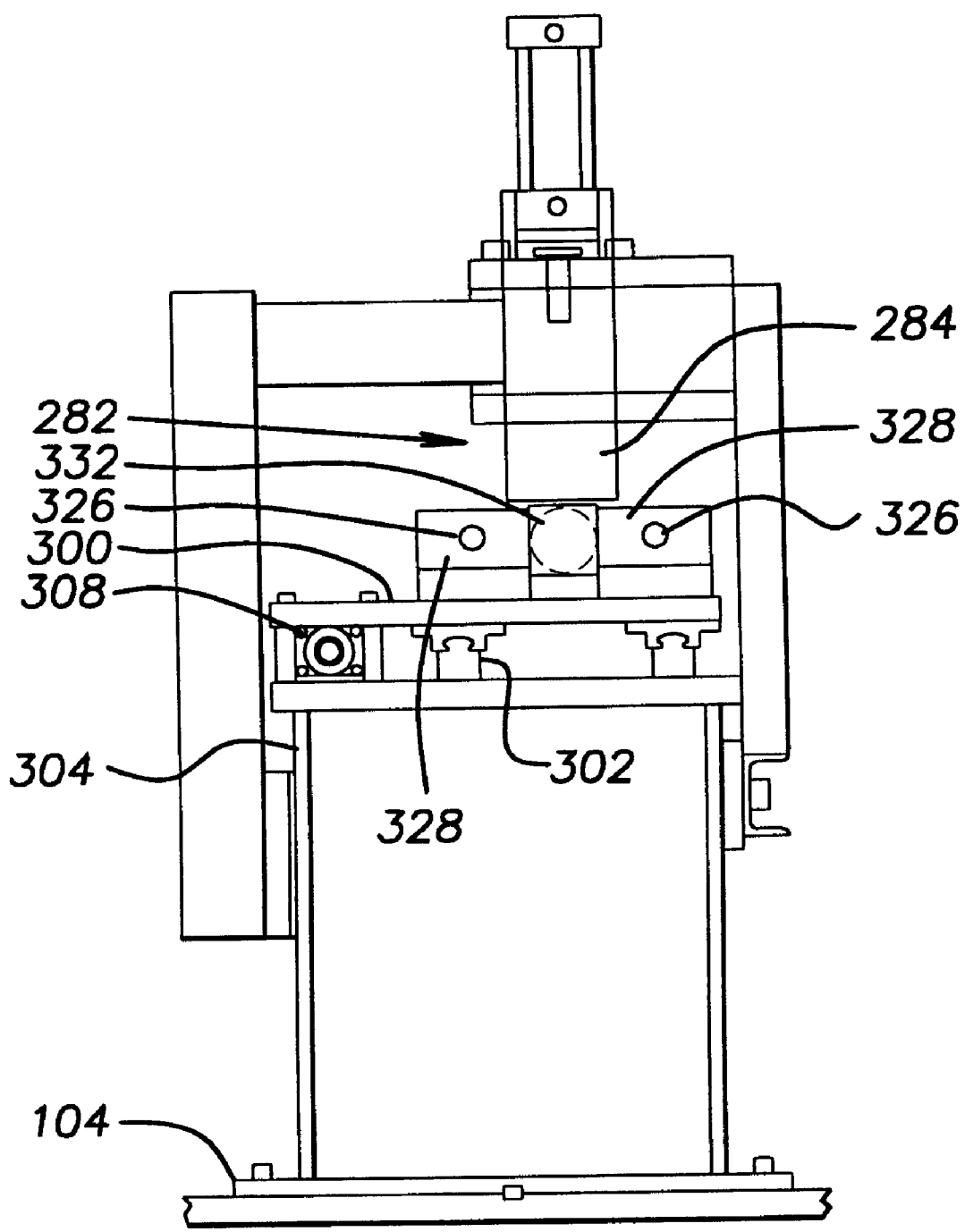
FIG. 22 is an end view, the plane of the view being indicated by the line 22—22 in FIG. 19.

As may be best seen in FIG. 21, the clamping head 298 mounts the jaws 296 by pivot pins 310 and includes a press check shaft 312 which extends through a central opening 314 in the head 298. The press check shaft 312 is associated with a piston rod 316 of a power cylinder 318 having a temposonic transducer. The jaws 296 are biased apart by tension springs 320 extending between the jaws 296 and the power head 298 and have outer edges which ride on guide rollers 322 mounted on a front crossbeam 324. The crossbeam 324 is fixed to a pair of guide rods 326 which slidably extend through the head 298, a pair of guide blocks 328 (see FIG. 20) and are fixed to a rear crossbeam 330. The crossbeam 330 is engaged by a rod and cylinder unit 332 which moves the rear crossbeam and, therefore, the front crossbeam 324. Forward movement of the front crossbeam 324 causes the jaws 296 to open and rearward movement of the beam 324 permits the jaws to close against the bias of the springs 320.

After the jaws 294 rotate the flats 84 to a vertical orientation, the jaws release and are retracted to clear the assembly. The clamping jaws 296 then engage the flats 84 on the other end of the shaft and the press check shaft 312 is advanced until a nose 332 of the shaft 312 engages the cone 56 of the bearing assembly 38. As may be seen in FIG. 21, a bore 334 in the shaft 312 receives the end of the shaft 26 and diametrically opposed slots 336 in the shaft 312 permit the jaws 296 to engage the shaft 26. A sliding plug 338 biased by a compression spring 340 within the bore 334 engages the end of the shaft 26.

With the shaft 26 gripped in this manner, the piston 308 is activated to cause the platform 300 and, therefore, the shaft 26 to be pushed back and forth. This movement (axial bearing) clearance is recorded by the transducer associated with the piston 308. Within the power cylinder 318, with the nose 332 of its associated shaft 312 in contact with the inner bearing race 56, is an encoder which computes the difference between measured clearance (the degree to which the shaft 26 may be moved back and forth by the piston 308) and the desired predetermined clearance. When this distance is computed, the piston 308 and its piston rod 316 causes the nose 332 of the shaft 312 to push the bearing race 56 the computed distance down the shaft 26. During this operation, the jaws 296 continue to grip the shaft to prevent axial displacement of the shaft 26. The shaft 26 is again moved back and forth to verify that the bearing clearance is now within the allowable limits. It should be appreciated that during the press check operation that the shaft 26 is subjected to a tensile load for the short distance between the jaws 296 and the bearing race 56 as compared to a compressive load on the entire shaft if the bearings 58 were adjusted to their desired position at the press cap station.

During the press check operation, the main shuttle 130 is shifted from the position illustrated in FIG. 11 to the position illustrated in FIG. 9. After the press check operation, the single lift unit 186 at the press check station is lowered to deposit the finished workpiece in the left end cradle 138 on the main shuttle 120 as viewed in FIG. 9. The main shuttle 120 is shifted to the position illustrated in FIG. 10 where the completed workpiece is at the unload station 182 having a pair of double left unloaders 350. One unloader 350 is provided on the stationary frame 104 and another is provided on the moveable frame 106.

The double left unloader 350 has an inclined cradle 352 mounted on a pair of pistons 354 (see FIG. 11). With the workpiece positioned at the unload station 182 as shown in FIG. 10, the cradle 352 is raised by the pistons 354 and the completed workpiece may then be removed from the cradle 352.

The workplace is then moved to a lubrication station wherein grease is added to the labyrinth passage 70 and the seals 42 and 44. Preferably the head assemblies 24 are pregreased prior to the press cap station 104. From the lubrication station, the assembly is moved to a press station wherein the exterior shields 28 are pressed onto the ends the shaft 26. Assembly of the idler roll is then complete.

While the invention has been described in connection with a particular sequence of assembly operations, those skilled in the art will appreciate that the invention also applies to other sequences. For example, the head assemblies 24 need not be preassembled. The roll end or head 36 may be affixed initially to the shell 22 by welding and the bearing assembly 38 may be press fitted onto the shaft 26 and into the hub portion 48 at the station 168. The back seal 40 would be installed in the hub portion 48 prior to the press fit operation. Operations at the press check station 180 would be identical to those previously described.

It should be further appreciated that joining operations other than welding may be employed to affix the head 36 to the shell 22.

Although particular embodiments of the invention have been described in detail, it will be understood that the invention is not limited correspondingly in scope, but includes all changes and modifications obvious to those skilled in the art.

What is claimed:

1. A method of assembling an idler roll having an outer shell and end bearing assemblies comprising the steps of:

a) providing a hollow cylindrical outer shell and a pair of end bearing assemblies, said end bearing assemblies each comprising a bearing having an inner and outer race, with said outer race affixed to an end cap and an inner race adapted to be press fit on an end of a roller shaft;

b) providing a roller shaft having an outside diameter slightly larger than an inside diameter of said inner race;

c) press fitting the inner race of each bearing assembly on said shaft at opposite ends thereof to an initial position which is spaced axially outwardly from a final desired position;

d) fitting each end cap within the ends of the outer shell;

e) welding each end cap to said outer shell;

f) restraining said outer shell and reciprocating said shaft along its longitudinal axis and relative to said shell to determine the degree of axial movement and, therefore, bearing clearance;

g) moving said inner race of said bearing assembly from its initial position to its final position as determined by said degree of axial movement.

2. A method according to claim 1 wherein each end cap is cooled after said welding step.

3. A method according to claim 1 wherein said shaft is grasped at one end to reciprocate said shaft while said outer shell is restrained.

4. A method according to claim 1 wherein said bearing is a tapered roller bearing.

5. A method of assembling an idler roll having an outer shell and end bearing assemblies comprising the steps of:

a) providing a hollow cylindrical outer shell and a pair of end bearing assemblies each comprising a bearing having an inner and outer race, with said outer race adapted to be affixed within a hub portion of an end cap and an inner race adapted to be press fit on an end of a roller shaft;

b) providing a roller shaft having an outside diameter slightly larger than the inside diameter of said inner race;

c) affixing each end cap to the ends of the outer shell;

d) press fitting the inner race of each bearing assembly on said shaft at opposite ends thereof to an initial position which is spaced outwardly from a final desired position while offering said outer race within said hub portion;

e) restraining said outer shell and reciprocating said shaft along its longitudinal axis and relative to said shell to determine the degree of axial movement and, therefore, bearing clearance; and f) moving said inner race of said bearing assembly from its initial position to its final position as determined by said degree of axial movement.

6. A method according to claim 5 wherein each end cap is welded to the ends of the outer shell.

7. A method of assembling an idler roll having an outer shell and end bearing assemblies comprising the steps of:

a) providing a transfer frame adapted to be horizontally translated from a first position in a first direction in two equal predetermined spatial increments and to be horizontally translated in a second opposite direction in a single increment back to said first position, said frame having a plurality of roll receiving cradles spaced apart a distance corresponding to said spatial increments;

b) providing a feed shuttle adapted to be horizontally reciprocated in single increments depositing a hollow cylindrical outer shell on a cradle on said feed shuttle and positioning a roll shaft within said shell at a loading station;

c) indexing said feed shuttle in a said spatial increment;

d) lifting said outer shell from said feed shuttle to a cap press station and providing a support at each end of said roll shaft along a central axis of said roll shell;

e) retracting said feed shuttle providing a pair of end bearing assemblies comprising a bearing having an inner and outer race, with said outer race affixed to an end cap and an inner race adapted to be press fit on an end of said roll shaft;

f) engaging each end of said shaft with the inner race of each bearing assembly and, while so engaged removing each roll shaft support;

g) press fitting the inner race of each bearing assembly on said shaft at opposite ends thereof to an initial position which is spaced axially outwardly from a final desired position;

h) fitting each end cap within the ends of the outer shell;

i) positioning a first one of said cradles of said transfer frame beneath said outer shell;

j) lowering said outer shell to said first one of said cradles;

k) indexing said transfer frame in a first one of said spatial increments;

l) lifting said outer shell to an idle station;

m) indexing said transfer frame in a second one of said spatial increments;

n) indexing said transfer frame in a second opposite direction back to said first position;

o) lowering said roll shell to a second one of said cradles immediately adjacent to said first one of said cradles;

p) indexing said transfer frame in a first one of said spatial increments;

q) lifting said roll shell to a weld station and welding said end cap to said roll shell;

r) lowering said roll shell indexing said transfer frame;

s) lowering said shell to a cradle on said transfer frame;

t) indexing said transfer frame to position said shell adjacent to a cooling station;

u) raising said shell to a cooling station and cooling said shell and bearing assembly;

v) lowering said shell to cradle on said transfer frame and indexing said frame to position said shell adjacent a press check station;

w) raising said shell and bearing assembly to a press check station;

x) reciprocating the roll shaft while restraining said shell to determine the extent of movement between the shell and shaft and, therefore, the bearing clearance;

y) moving the inner race of one of the bearings along the shaft to a predetermined axial location; and z) removing a completed roll assembly from the frame.

* * * * *

UNITED STATES PATENT AND TRADEMARK OFFICE
CERTIFICATE OF CORRECTION

PATENT NO. : 6,385,849 B1
DATED : May 14, 2002
INVENTOR(S) : Bryant, Jr. et al.

It is certified that error appears in the above-identified patent and that said Letters Patent is hereby corrected as shown below:

Column 11,
Line 44, delete "while offering said outer race within said hub portion".

Signed and Sealed this

Nineteenth Day of November, 2002

Attest:

Attesting Officer

JAMES E. ROGAN
Director of the United States Patent and Trademark Office